United States Patent
Miyoshi et al.

(10) Patent No.: US 11,780,648 B2
(45) Date of Patent: Oct. 10, 2023

(54) TUBULAR CONTAINER AND METHOD FOR PRODUCING SAME

(71) Applicant: TOPPAN PRINTING CO., LTD., Tokyo (JP)

(72) Inventors: Seiki Miyoshi, Tokyo (JP); Minoru Kawasaki, Tokyo (JP); Takeshi Saito, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/228,646

(22) Filed: Apr. 12, 2021

(65) Prior Publication Data

US 2021/0292049 A1    Sep. 23, 2021

Related U.S. Application Data

(63) Continuation of application No. PCT/JP2019/041022, filed on Oct. 18, 2019.

(30) Foreign Application Priority Data

Oct. 19, 2018  (JP) .................................. 2018-197537
Oct. 22, 2018  (JP) .................................. 2018-198497

(Continued)

(51) Int. Cl.
*B65D 35/12*     (2006.01)
*B65D 47/08*     (2006.01)
(Continued)

(52) U.S. Cl.
CPC ............. *B65D 35/12* (2013.01); *B65D 35/10* (2013.01); *B65D 35/20* (2013.01); *B65D 35/38* (2013.01);
(Continued)

(58) Field of Classification Search
CPC .... B65D 35/12; B65D 47/0838; B65D 51/20; B65D 2251/0025; B65D 2251/0093;
(Continued)

(56) References Cited

U.S. PATENT DOCUMENTS 3,160,327 A * 12/1964 Porcelli ................ B65D 47/103
                                                    220/837
3,260,411 A    7/1966 Egremont
(Continued)

FOREIGN PATENT DOCUMENTS

EP    1426301 A1    6/2004
JP    S45-021267 Y  8/1970
(Continued)

*Primary Examiner* — Frederick C Nicolas
(74) *Attorney, Agent, or Firm* — Squire Patton Boggs (US) LLP

(57) ABSTRACT

Provided is a tubular container capable of improving extractability of contents inside the container. The tubular container includes: a trunk portion having a tubular shape one end of which is closed, the trunk portion being formed by using a film member containing a resin material, and being capable of storing contents therein; and a spout portion attached to the other end of the trunk portion, and capable of closing the other end of the trunk portion. On a peripheral portion of the spout portion, the other end of the trunk portion is attached to a surface, of the spout portion, on a side opposite to the one end of the trunk portion.

31 Claims, 29 Drawing Sheets

(30) Foreign Application Priority Data

| Oct. 22, 2018 | (JP) | 2018-198499 |
|---|---|---|
| Sep. 26, 2019 | (JP) | 2019-175723 |
| Sep. 27, 2019 | (JP) | 2019-177560 |

(51) Int. Cl.

| B65D 51/20 | (2006.01) |
|---|---|
| B65D 51/22 | (2006.01) |
| B65D 35/38 | (2006.01) |
| B65D 35/20 | (2006.01) |
| B65D 35/42 | (2006.01) |
| B65D 35/10 | (2006.01) |

(52) U.S. Cl.
CPC ......... B65D 35/42 (2013.01); B65D 47/0838 (2013.01); B65D 51/20 (2013.01); B65D 51/22 (2013.01); *B65D 2251/0025* (2013.01); *B65D 2251/0093* (2013.01)

(58) Field of Classification Search
CPC ........ B65D 35/10; B65D 35/20; B65D 35/38; B65D 35/42; B65D 51/22

See application file for complete search history.

(56) References Cited

U.S. PATENT DOCUMENTS

| 3,307,738 | A | | 3/1967 | Scheindel | |
|---|---|---|---|---|---|
| 4,205,765 | A | * | 6/1980 | May | A21C 15/005 |
| | | | | | 222/107 |
| 4,356,939 | A | * | 11/1982 | Fitte | B65D 47/103 |
| | | | | | 222/541.9 |
| 4,533,062 | A | * | 8/1985 | Krautkramer | B65D 51/1644 |
| | | | | | 220/203.18 |
| 4,635,826 | A | * | 1/1987 | Hatakeyama | B65D 47/2075 |
| | | | | | 215/21 |
| 4,746,025 | A | * | 5/1988 | Krautkramer | B29C 66/131 |
| | | | | | 215/253 |
| 4,815,618 | A | * | 3/1989 | Gach | B65D 47/0857 |
| | | | | | 220/258.2 |
| 4,948,015 | A | * | 8/1990 | Kawajiri | B65D 5/749 |
| | | | | | 222/541.9 |
| 5,133,486 | A | * | 7/1992 | Moore | B65D 47/103 |
| | | | | | 229/125.05 |
| 5,199,618 | A | * | 4/1993 | Reil | B65D 11/04 |
| | | | | | 222/541.9 |
| 5,301,849 | A | * | 4/1994 | Guglielmini | B65D 47/0814 |
| | | | | | 222/541.9 |
| 5,755,360 | A | * | 5/1998 | Elliott | B65D 47/103 |
| | | | | | 222/153.07 |
| 6,793,101 | B2 | | 9/2004 | Shinozaki | B65D 47/103 |
| | | | | | 222/153.07 |
| 6,805,261 | B1 | * | 10/2004 | Laudenberg | B65D 75/5883 |
| | | | | | 222/569 |
| 7,222,751 | B2 | * | 5/2007 | Kerman | B65D 35/46 |
| | | | | | 222/494 |
| 7,832,579 | B2 | * | 11/2010 | Lohrman | B65D 47/36 |
| | | | | | 215/256 |
| 8,740,023 | B2 | * | 6/2014 | Geiger | B65D 47/2025 |
| | | | | | 222/422 |
| 9,598,209 | B1 | * | 3/2017 | Maldonado | B65D 47/103 |
| 2004/0035883 | A1 | * | 2/2004 | Schellenberg | B65D 5/746 |
| | | | | | 222/541.9 |
| 2006/0000793 | A1 | * | 1/2006 | Mavin | B65D 51/20 |
| | | | | | 222/153.07 |
| 2012/0205404 | A1 | * | 8/2012 | Massey | B65D 35/38 |
| | | | | | 222/107 |
| 2013/0277392 | A1 | * | 10/2013 | Dominguez | B65D 75/5866 |
| | | | | | 383/41 |
| 2015/0028056 | A1 | * | 1/2015 | Massis | A23G 3/28 |
| | | | | | 222/107 |
| 2017/0021976 | A1 | * | 1/2017 | Wang | B29C 49/4278 |
| 2018/0099787 | A1 | * | 4/2018 | Yoshida | B65D 47/122 |
| 2019/0389629 | A1 | | 12/2019 | Hashimoto | |
| 2020/0270044 | A1 | | 8/2020 | Weyrauch | |

FOREIGN PATENT DOCUMENTS

| JP | S46-15356 | B | 4/1971 |
|---|---|---|---|
| JP | S48-72243 | U | 9/1973 |
| JP | S54-167165 | U | 11/1979 |
| JP | S57-055754 | U | 4/1982 |
| JP | S58-024739 | U | 2/1983 |
| JP | S59-121346 | U | 8/1984 |
| JP | S61-186519 | U | 11/1986 |
| JP | H2-034434 | U | 3/1990 |
| JP | H7-041020 | | 2/1995 |
| JP | H09-085145 | A | 3/1997 |
| JP | H09-142499 | A | 6/1997 |
| JP | 2000-248130 | A | 9/2000 |
| JP | 2000-255602 | A | 9/2000 |
| JP | 2001-055238 | A | 2/2001 |
| JP | 2001-114274 | A | 4/2001 |
| JP | 2002-019814 | A | 1/2002 |
| JP | 2002-524360 | A | 8/2002 |
| JP | 2005-239199 | A | 9/2005 |
| JP | 2006-21816 | A | 1/2006 |
| JP | 2007-197083 | A | 8/2007 |
| JP | 2007-331781 | A | 12/2007 |
| JP | 2008-001372 | A | 1/2008 |
| JP | 2008-308191 | A | 12/2008 |
| JP | 2009-154927 | A | 7/2009 |
| JP | 3158229 | U | 3/2010 |
| JP | 2010-083546 | A | 4/2010 |
| JP | 2012-025471 | A | 2/2012 |
| JP | 2012-162283 | A | 8/2012 |
| JP | 2013-022918 | A | 2/2013 |
| JP | 2013-082484 | A | 5/2013 |
| JP | 2013-103766 | A | 5/2013 |
| JP | 2015-096431 | A | 5/2015 |
| JP | 2016-199280 | A | 12/2016 |
| JP | 2016204011 | | 12/2016 |
| JP | 2017-213784 | A | 12/2017 |
| NL | 6509008 | A | 1/1966 |
| WO | WO 2000/050314 | A1 | 8/2000 |
| WO | WO 2016/163378 | A1 | 10/2016 |
| WO | WO 2018/173451 | A1 | 9/2018 |
| WO | WO 2019/057265 | A1 | 3/2019 |

* cited by examiner

A - A

3101

FIG.15
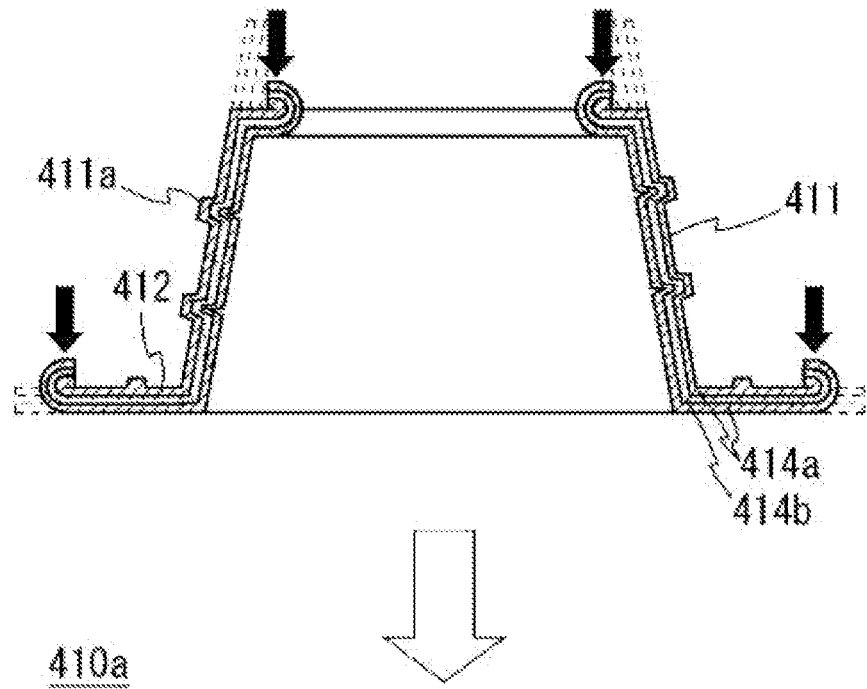
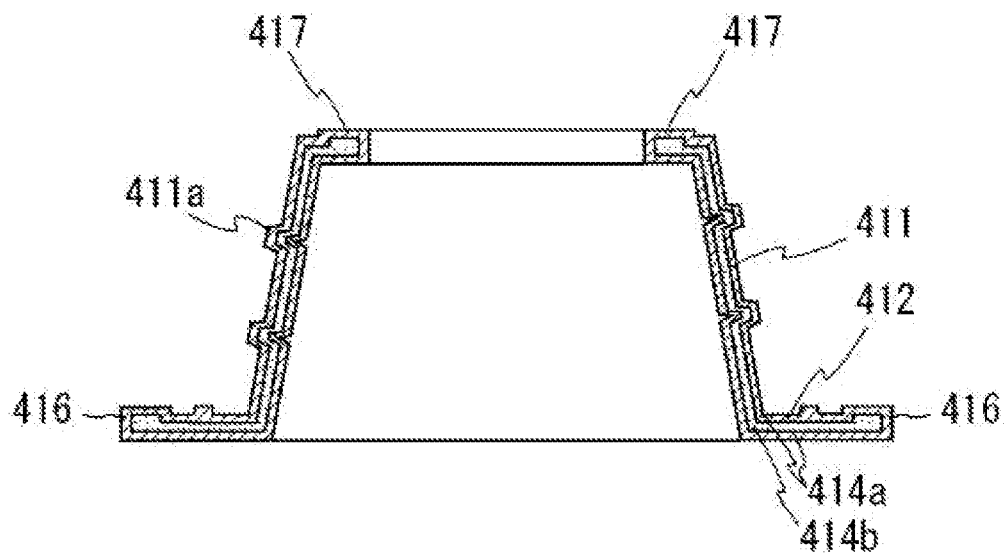

5400

F - F'

K - K'

710a

M – M'

TUBULAR CONTAINER AND METHOD FOR PRODUCING SAME

CROSS REFERENCE TO RELATED APPLICATIONS

This application is a continuation of International Application PCT/JP2019/41022 filed on Oct. 18, 2019, which claims benefit of Japanese Patent Application No. 2018-197537, filed on Oct. 19, 2018, Japanese Patent Application No. 2018-198497, filed on Oct. 22, 2018, Japanese Patent Application No. 2018-198499, filed on Oct. 22, 2018, Japanese Patent Application No. 2019-175723, filed on Sep. 26, 2019, and Japanese Patent Application No. 2019-177560, filed on Sep. 27, 2019, all of which are incorporated herein by reference in their entireties.

BACKGROUND

Field

The present invention relates to a tubular container and a method for producing the same.

Description of the Related Art

Tubular containers capable of being filled with pharmaceutical products, cosmetic products, foods, etc., and packaging these contents, have been known. A tubular container generally includes: a tubular trunk portion having one end being closed and the other end being opened; and a spout portion (also called a shoulder portion) attached to the open end of the trunk portion by welding or the like. The spout portion is formed in a tapered shape in which the outer diameter decreases with an increasing distance from the open end of the trunk portion. An opening through which the contents can be taken out is formed in a part, of the spout portion, on the side opposite to the trunk portion, and a user of the tubular container can discharge the contents from the opening by squeezing the trunk portion (see Japanese Laid-Open Patent Publication No. 2016-199280).

Furthermore, in the tubular container disclosed in Japanese Laid-Open Patent Publication No. 2016-199280, a highly rigid trunk portion is formed by using a film member that is formed of a resin, has a thickness of about 200 μm to 400 μm, and has a relatively high elastic modulus (high stiffness). Therefore, when the trunk portion returns to its original shape after the contents have been discharged from the squeezed and deformed trunk portion, a phenomenon called "air back", i.e., inflow of air into the trunk portion, occurs. When squeezing out the contents again, the inflow air is pushed together with the trunk portion, so that the contents are pushed out from the spout portion by the pressure of the inflow air.

Meanwhile, Japanese Laid-Open Patent Publication No. 2002-19814 discloses a spout portion that includes a flange portion, a spouting tube portion, a sealing plate portion that closes the spouting tube portion, and a pull ring (grip) provided in the sealing plate portion. The spout is attached to a spout attachment hole formed at the top of a packaging container (paper container for liquid) together with a cap attached so as to cover the spouting tube portion. In this spout, a gas barrier film is insert-molded in the flange portion in order to enhance gas barrier performance of the packaging container.

SUMMARY

An object of the present invention is to provide a tubular container that can improve dischargeability of the contents inside the container.

One aspect of the present invention is a tubular container including: a trunk portion having a tubular shape one end of which is closed, the trunk portion being formed by using a film member containing a resin material, and being capable of storing contents therein; and a spout portion attached to the other end of the trunk portion, and capable of closing the other end of the trunk portion. On a peripheral portion of the spout portion, the other end of the trunk portion is attached to a surface, of the spout portion, on a side opposite to the one end of the trunk portion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a vertical cross-sectional view of a spout portion used in a packaging container according to a modification of the fourth embodiment of the present invention;

DETAILED DESCRIPTION

First Embodiment

According to the present embodiment, it is possible to provide a tubular container that can inhibit the contents from remaining inside the container.

A tubular container 1100 according to a first embodiment of the present invention will be described with reference to the drawings. The tubular container 1100 includes a trunk portion 110 one end of which is closed, and a spout portion 120 attached to the other end of the trunk portion 110. The tubular container 1100 further includes, for example, a hinge cap 130 to be attached to the spout portion 120.

Figure 1:
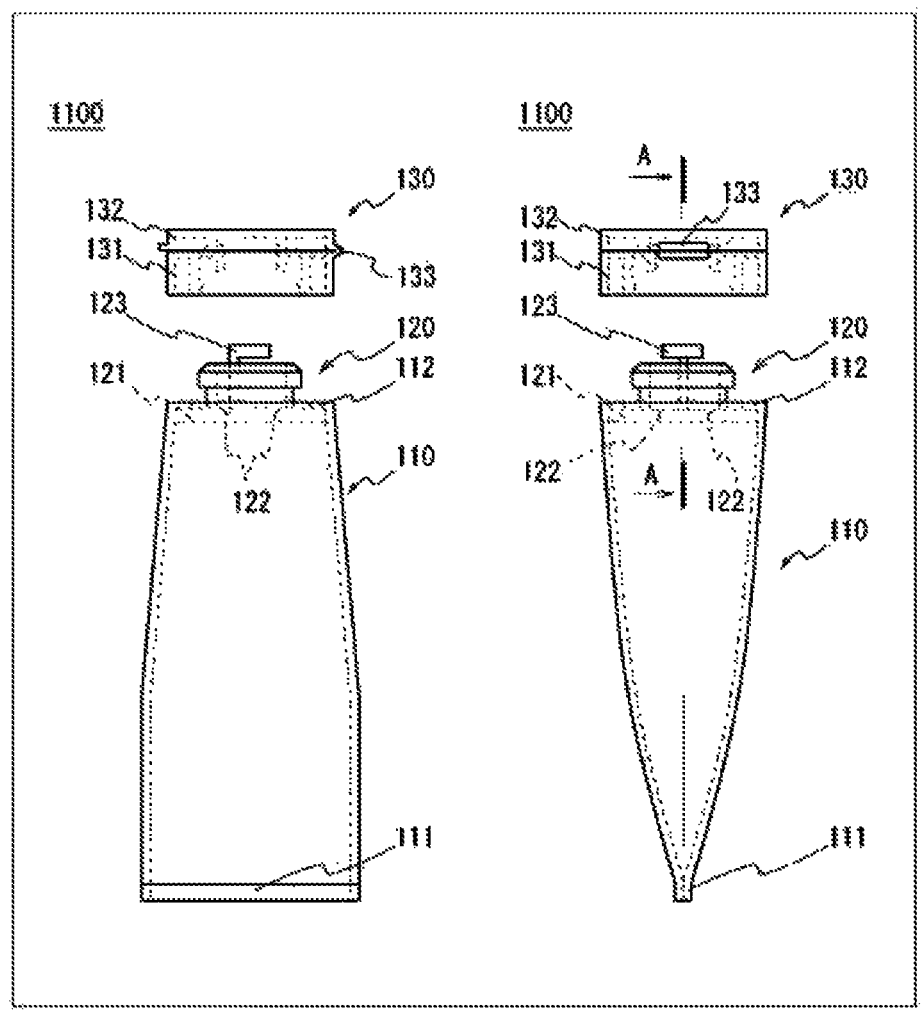
FIG. 1 shows a front view and a side view of a tubular container according to a first embodiment of the present invention.
Figure 2:
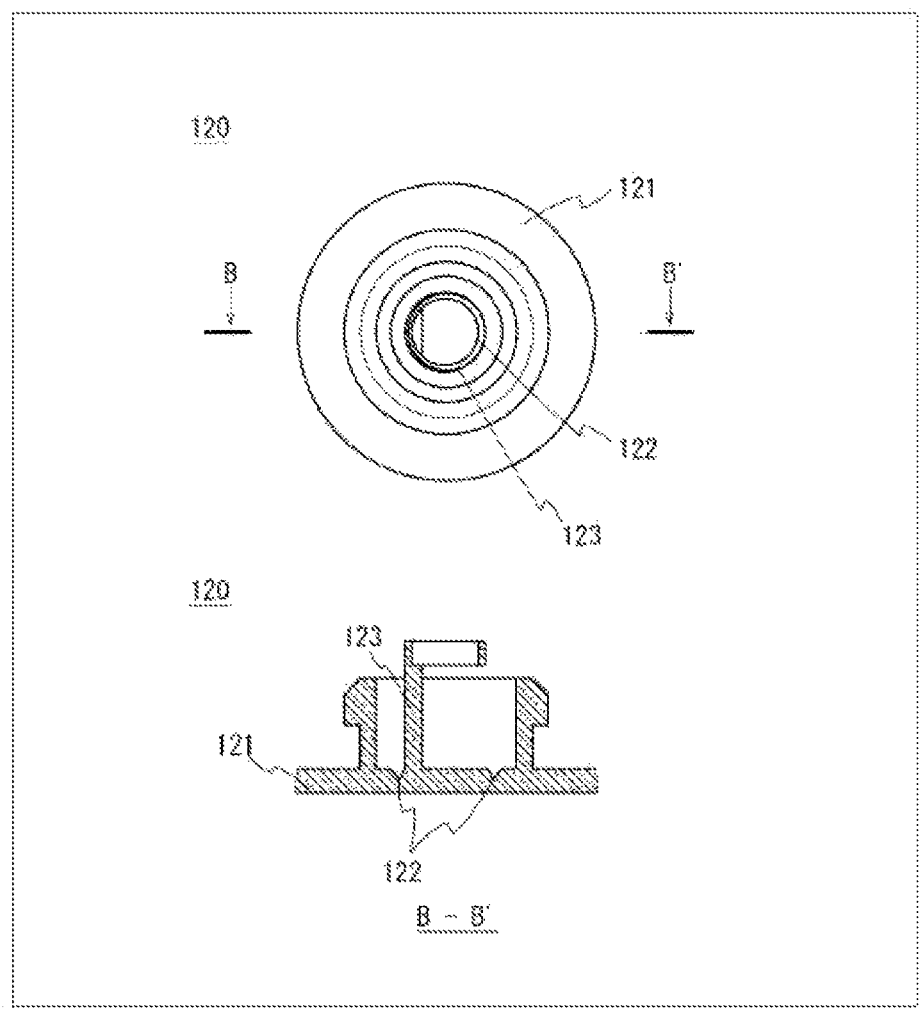
FIG. 2 shows a cross-sectional view and a plan view of a spout portion of the tubular container according to the first embodiment of the present invention.
Figure 3:
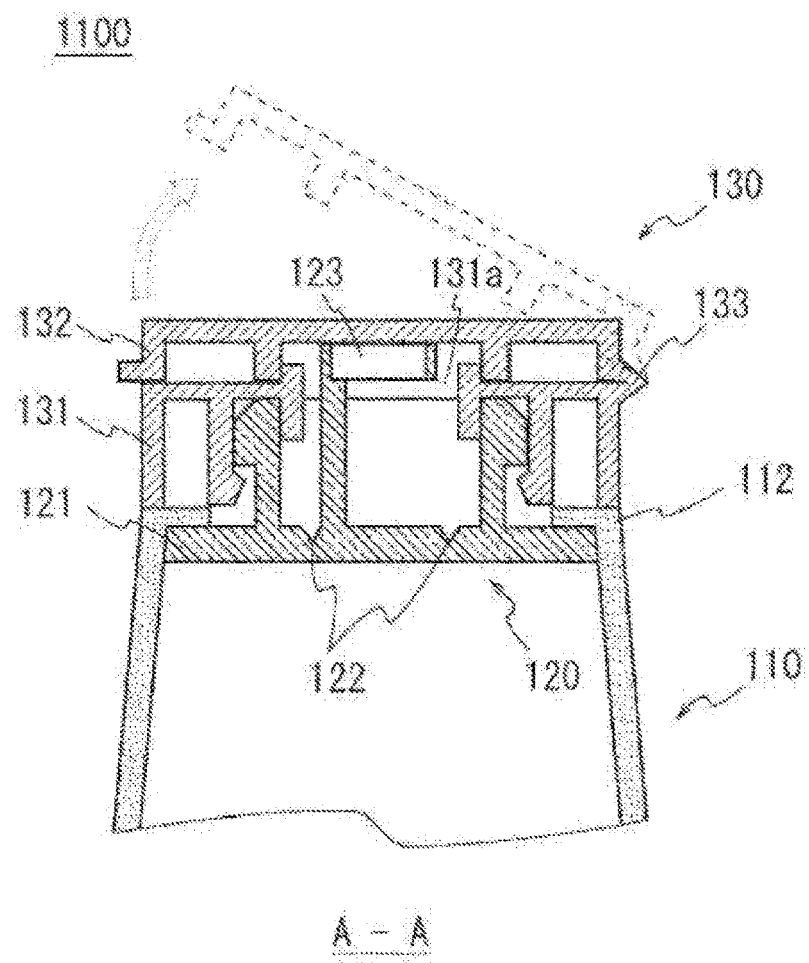
FIG. 3 is an enlarged cross-sectional view of a major part of the tubular container according to the first embodiment of the present invention.

FIG. 1 shows a front view and a side view of the tubular container 1100. FIG. 2 shows a plan view of the spout portion 120 and a cross-sectional view cut along a B-B' line. FIG. 3 is an enlarged cross-sectional view, cut along an A-A line in FIG. 1, of the spout portion 120 and its vicinity to which the hinge cap 130 is attached. FIG. 1 shows, for convenience sake, the spout portion 120 to which the hinge cap 130 is not attached.

The trunk portion 110 is a tubular member that is formed of a soft material, has a closed bottom portion 111 at one end thereof, and is able to store contents (not shown) therein. For example, the trunk portion 110 can be formed as follows. That is, after a film (also referred to as "film member") is shaped like a tube, opposed parts of the film at the bottom portion 111 are adhered to each other, and opposed parts of the film at the edges along the longitudinal direction of the trunk portion 110 are adhered to each other. The film adhering method is not particularly limited. For example, a method of forming adhesive layers containing polyethylene on the film, and heat-sealing these layers, can be adopted.

The spout portion 120 is a member that is attached to a top portion 112 located at the other end of the trunk portion 110 and is able to close the top portion 112 of the trunk portion 110. The spout portion 120 includes a plate-shaped closing portion 121 orthogonal to the longitudinal direction of the trunk portion 110. As shown in FIG. 2, the closing portion 121 has a circular-plate shape, for example. The shape of the closing portion 121 is not limited as long as it is a plate shape, and may be an ellipse, an elongated circle, a polygon, or any other shape. The material of the spout portion 120 is not particularly limited, but a resin material such as low-density polyethylene can be preferably used. The spout portion 120 having the plate-shaped closing portion 121 can reduce the material to be used, as compared to the tapered spout portion according to the conventional art.

The closing portion 121 has, for example, an annular half cut 122 at substantially the center thereof, and a pull ring 123 inside the half cut 122. Since the closing portion 121 has the half cut 122 and the pull ring 123, a user of the tubular container 1100 can remove a part of the closing portion 121 along the half cut 122 by pulling the pull ring 123, thereby forming an opening, in the closing portion 121, through which the contents can be taken out. Instead of providing the half cut 122 and the pull ring 123, an opening for taking out the contents may be formed in the closing portion 121 in advance.

As shown in FIGS. 1 and 3, the top portion 112 of the trunk portion 110 is, at an edge (peripheral portion) of the closing portion 121, adhered to a surface, of the closing portion 121, on the side opposite to the bottom portion 111 of the trunk portion 110. The method of adhering the trunk portion 110 and the closing portion 121 is not particularly limited. For example, a method of forming an adhesive layer containing polyethylene on an innermost layer of the film, forming the spout portion 120 using a material containing polyethylene, and heat-sealing them, can be adopted.

The hinge cap 130 is a member that is attached to the spout portion 120 and enables closing and opening of an opening formed in the spout portion 120. The hinge cap 130 includes: a tubular fixing portion 131 that is attached and fixed to the spout portion 120 and has a hole 131a for spouting; and a cap 132 pivotally attached to the fixing portion 131 via a hinge 133. As shown in FIG. 3, the hole 131a of the fixing portion 131 is formed such that, in a planar view, the center thereof overlaps the center of the opening formed in the spout portion 120. Therefore, the opening formed in the spout portion 120 is closed and opened when the cap 132 closes and opens the hole 131a of the fixing portion 131. The material of the hinge cap 130 is not particularly limited, but a resin material such as polypropylene, polyethylene, or low-density polyethylene can be used.

The structure for fixing the hinge cap 130 to the spout portion 120 is not particularly limited. For example, as shown in FIG. 3, a tubular engagement wall is provided to each of the hinge cap 130 and the closing portion 121, and the engagement walls are fitted and fixed to each other.

As shown in FIG. 3, the inner circumferential diameter of the hole 131a for spouting formed in the fixing portion 131 of the hinge cap 130 is preferably greater than the diameter of the half cut 122 and the outer diameter of the pull ring 123. Thus, when an opening is formed in the closing portion 121 by use of the pull ring 123, the pull ring 123 can be easily picked up from the outside of the hole 131a of the fixing portion 131, and the removed part of the closing portion 121 can be taken out through the hole 131a. Therefore, the opening can be easily formed in the spout portion 120 without removing the hinge cap 130 from the spout portion 120.

As shown in FIGS. 1 and 3, a ring portion at an upper end of the pull ring 123 may be formed such that at least a part thereof is located outward of the hole 131a of the fixing portion 131. This allows the pull ring 123 to be picked up more easily as compared to the case where the ring portion is located inward of the hole 131a. Thus, an opening can be formed in the spout portion 120 more easily.

The structure for realizing closing and opening of the opening formed in the spout portion 120 is not limited to the hinge cap 130. For example, a structure including: a cylindrical member provided on the spout portion 120 and having an outer thread, and a cap having an inner thread fittable to the outer thread, may be adopted.

(Function of Spout Portion)

Figure 4:
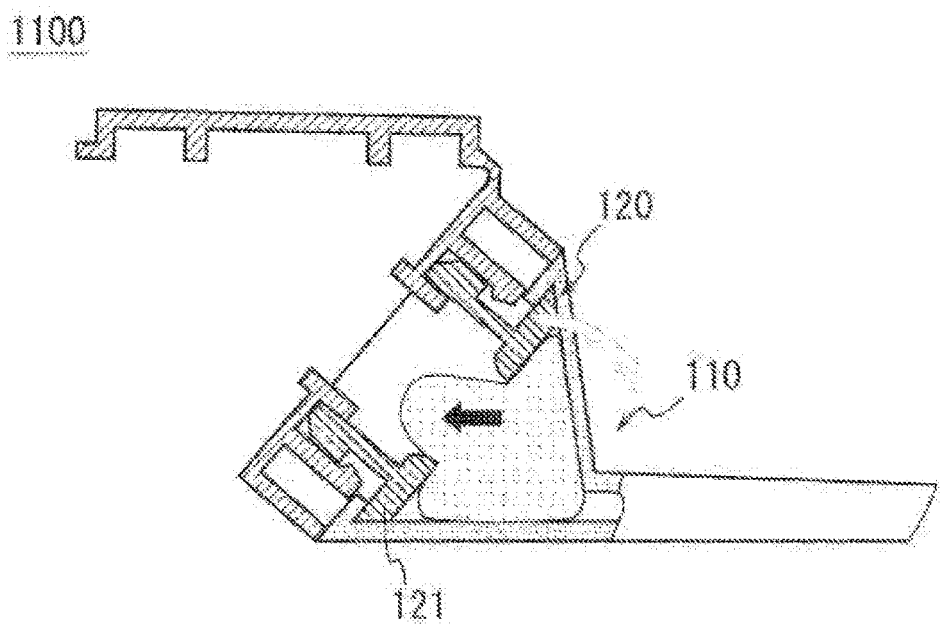
FIG. 4 is a cross-sectional view illustrating how to take out contents from the tubular container according to the first embodiment of the present invention.

FIG. 4 is a cross-sectional view showing the state of the tubular container 1100 when a small amount of contents remaining in the trunk portion 110 is taken out.

In the tubular container 1100, the spout portion 120 includes the plate-shaped closing portion 121 orthogonal to the longitudinal direction of the trunk portion 110, and the top portion 112 of the trunk portion 110 is, at the edge of the closing portion 121, adhered to the surface, of the closing portion 121, on the side opposite to the bottom portion 111 of the trunk portion 110. Therefore, as shown in FIG. 4, when the trunk portion 110 is bent at the edge of the closing portion 121 with a finger or the like, a small amount of contents remaining in the trunk portion 110 can be pushed toward the periphery of the opening of the spout portion 120 while being sandwiched by the inner-side surface of the closing portion 121 and the inner surface of the trunk portion 110.

Since the closing portion 121 of the spout portion 120 has a plate shape, a space that allows the contents to remain therein is not present on the inner side of the closing portion 121, in contrast to the tapered spout portion according to the conventional art. Therefore, the contents pushed toward the periphery of the opening of the spout portion 120 can be squeezed out from the opening without being remained inside the trunk portion 110 and the spout portion 120. As a result, remaining of the contents inside the container can be inhibited.

In the tubular container 1100, as described above, remaining of the contents can be inhibited by squeezing out the contents while bending the trunk portion 110. Therefore, the trunk portion 110 is preferably formed of a film having a low rigidity (less stiff) that allows the trunk portion 110 to be easily bent. Regarding the cap, the aforementioned hinge cap 130 allows a reduction in rigidity, against distortion, that is required of the trunk portion 110 to be held by hand when the cap is opened, as compared to the cap that is thread-engaged with the closing portion and turned to be opened. Therefore, a film having a low rigidity can be used.

Second Embodiment

According to the present embodiment, it is possible to provide a tubular container that inhibits smooth discharge of the contents after unsealing from being impeded by the gas barrier film, while ensuring sealing property and gas barrier property before unsealing for the first time.

A tubular container according to a second embodiment of the present invention will be described with reference to the drawings. In the following description, the same or corresponding components between the embodiments and modifications are designated by the same reference characters, and the description thereof is omitted.

Figure 5:
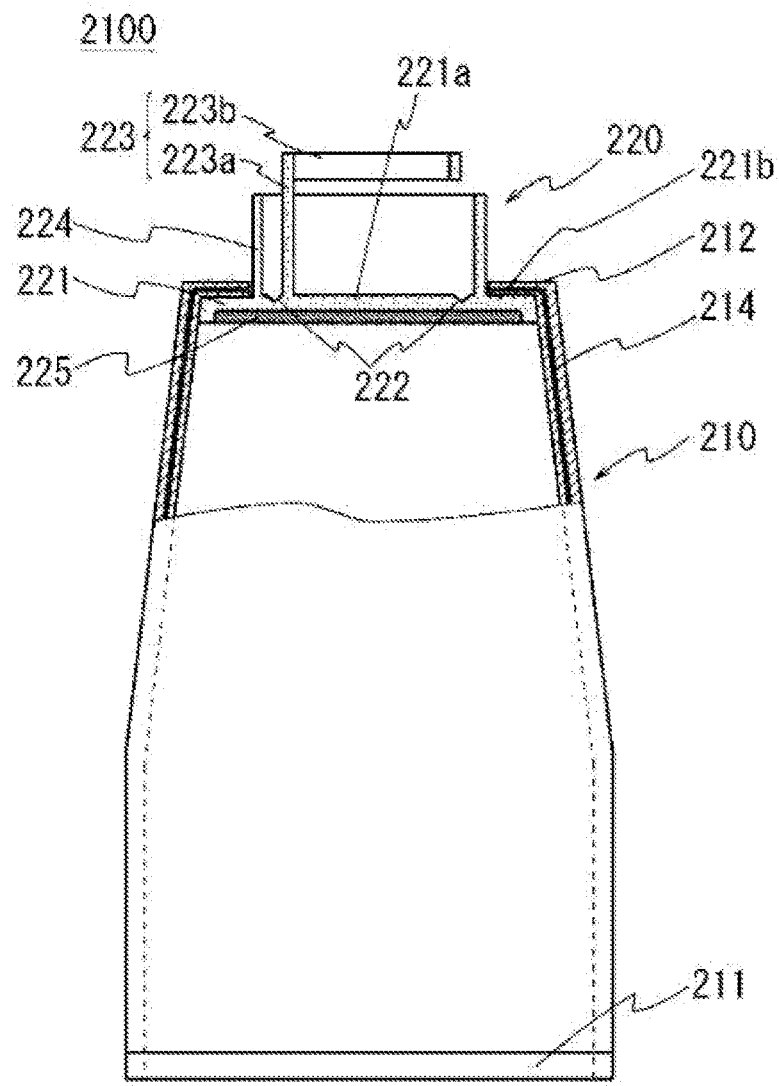
FIG. 5 is a front view of a tubular container according to a second embodiment of the present invention.

A tubular container 2100 according to a second embodiment of the present invention includes a trunk portion 210 one end of which is closed, and a spout portion 220 attached to the other end of the trunk portion 210. FIG. 5 is a front view of the tubular container 2100.

The trunk portion 210 is a tubular member that is formed of a lamination member including a gas barrier layer 214, has a closed bottom portion 211 located at one end thereof, and is able to store contents (not shown) therein. For example, the trunk portion 210 can be formed as follows. That is, after a film (lamination film) including the gas barrier layer 214 is shaped like a tube, opposed parts of the film at the bottom portion 211 are adhered to each other, and opposed parts of the film at the edges along the longitudinal direction (the up-down direction of the sheet of FIG. 5) of the trunk portion 210 are adhered to each other. The film adhering method is not particularly limited. For example, a method of providing the film with adhesive layers containing polyethylene, and heat-sealing these layers, can be adopted. The material of the gas barrier layer 214 is not particularly limited as long as it is a film member having gas barrier property. For example, aluminum foil or a resin film containing EVOH resin or the like can be used.

Figure 6:
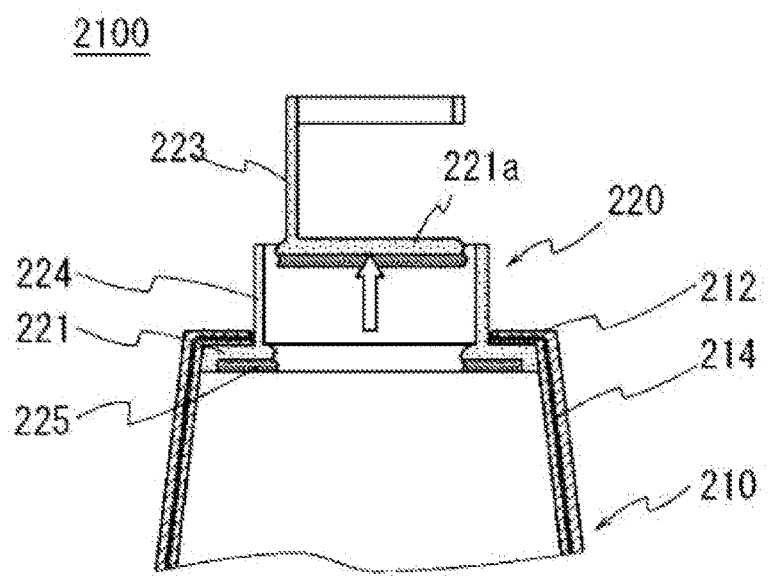
FIG. 6 is a front view illustrating how to unseal the tubular container according to the second embodiment of the present invention.

The spout portion 220 is a member that is attached to a top portion 212 located at the other end of the trunk portion 210 and is able to close the top portion 212 of the trunk portion 210. The spout portion 220 includes, for example, a plate-shaped closing portion 221 orthogonal to the longitudinal direction of the trunk portion 210. As shown in FIG. 6, the closing portion 221 has, for example, a circular-plate shape in a planar view. The shape of the closing portion 221 is not particularly limited, and may be an ellipse, an elongated circle, a polygon, or any other shape. The material of the spout portion 220 is not particularly limited, but a resin material such as straight-chain low-density polyethylene or low-density polyethylene can be preferably used. The spout portion 220 having the plate-shaped closing portion 221 can reduce the material to be used, as compared to the tapered spout portion according to the conventional art. The closing portion 221 may not necessarily have the plate shape orthogonal to the longitudinal direction of the trunk portion 210, and may have any shape as long as a half cut 222 and a gas barrier film 225 described later can be formed. The closing portion 221 may have a tapered shape having a shoulder portion the outer diameter of which decreases with an increasing distance from the top portion 212.

The closing portion 221 includes: an annular half cut 222 formed at substantially the center thereof; a pick-up portion 223 extending from an inner side of the half cut 222 toward a side opposite to the bottom portion 211 of the trunk portion 210; a tubular peripheral wall 224 disposed outside the half cut 222 and extending toward a side opposite to the bottom portion 211 of the trunk portion 210; and a gas barrier film 225.

The pick-up portion 223 is, for example, a pull ring including: a support portion 223a extending from the closing portion 221; and a ring portion 223b that is provided at an end, of the support portion 223a, on the side opposite to the spout portion 220, and allows the user to insert a finger therein. Since the closing portion 221 includes the half cut 222 and the pick-up portion 223, when the user of the tubular container 2100 pulls the pick-up portion 223 with a predetermined force, the user can remove a to-be-opened portion 221a (an area surrounded by the half cut 222), which is a part of the closing portion 221, along the half cut 222 together with the gas barrier film 225, thereby forming an opening, in the closing portion 221, through which the contents can be taken out. As described above, in the tubular container 2100, the other end of the trunk portion 210 is closed by the spout portion 220, and a part of the closing portion 221 is removed to form an opening in the spout portion 220 when the tubular container 2100 is unsealed for the first time. Therefore, sealing property before unsealing for the first time can be ensured. A weakened line corresponding to the shape of the half cut 222 may be formed in the gas barrier film 225 to facilitate removal of the to-be-opened portion 221a.

The pick-up portion 223 is not limited to a pull ring, and may have any shape as long as the user can remove a part of the closing portion 221 by pulling the same. For example, the pick-up portion 223 may be a plate-shaped pick-up margin extending from the closing portion 221.

The peripheral wall 224 is provided for attaching a cap (not shown) that closes the opening formed in the spout portion 220. The peripheral wall 224 may have a thread or an engagement claw for fixing the cap.

The gas barrier film 225 is a film provided on a surface, of the spout portion 220, facing the inside of the tubular container 2100, in order to impart gas barrier property to a predetermined area of the spout portion 220. The material of the gas barrier film 225 is not particularly limited as long as it is a film member having gas barrier property and removable along the half cut 222 together with a part of the closing portion 221 as described later. For example, aluminum foil, an EVOH resin, or the like can be used. The method of providing the spout portion 220 with the gas barrier film 225 is as follows, for example. That is, the gas barrier film 225 may be heat-sealed to the molded spout portion 220, or the gas barrier film 225 may be integrally molded (insert-molded) with the spout portion 220. The edge (end face) of the gas barrier film 225 may be exposed, or may be covered with the closing portion 221 as shown in FIG. 5. Covering the edge of the gas barrier film 225 with the closing portion 221 inhibits occurrence of delamination from the edge of the gas barrier film 225.

As shown in FIG. 5 and FIG. 6, the inner peripheral surface of the trunk portion 210 near the top portion 212 is adhered to the surface, of the closing portion 221, on the side opposite to the bottom portion 211 of the trunk portion 210, over the entire periphery, at a peripheral portion 221b that is an edge around the to-be-opened portion 221a of the closing portion 221. The method of adhering the trunk portion 210 and the closing portion 221 is not particularly limited. For example, a method of disposing an adhesive layer containing polyethylene on an innermost layer of the film, forming the spout portion 220 using a material containing polyethylene, and heat-sealing them, may be adopted.

At this time, it is assumed that: an area, of the peripheral portion 221b, to which the inner peripheral surface near the top portion is adhered is a first area; an area, of the surface of the spout portion 220 facing the inside of the tubular container 2100, where the gas barrier film 225 is disposed is a second area; and an area over the entire periphery of the peripheral portion 221b of the spout portion 220 is a third area. Then, the trunk portion 210 is adhered to the closing portion 221 of the spout portion 220 so as to satisfy the following conditions. That is, the trunk portion 210 is adhered and attached to the spout portion 220 such that the first area and the second area overlap each other, as viewed from a normal direction in the third area. Specifically, in the case of the tubular container 2100, since the closing portion 221 has a plate shape orthogonal to the longitudinal direction of the trunk portion 210, the trunk portion 210 is adhered and attached to the closing portion 221 of the spout portion 220 such that, in a planar view, the gas barrier layer 214 and the gas barrier film 225 overlap each other as shown in FIG. 5.

Thus, in the tubular container 2100 in which the trunk portion 210 is attached to the spout portion 220, the gas barrier layer 214 and the gas barrier film 225 overlap each other as viewed from the normal direction at each position on the peripheral portion of the closing portion 221. Therefore, an area having no gas barrier property is absent, thereby realizing high gas barrier property. Thus, the trunk portion 210 and the spout portion 220 ensure gas barrier property and sealing property before unsealing for the first time (before formation of an opening in the spout portion 220).

FIG. 6 is a cross-sectional view of the spout portion 220 when a part of the closing portion 221 is removed along the half cut 222 to form an opening in the closing portion 221. As shown in FIG. 6, when the pick-up portion 223 is pulled with a predetermined force, the to-be-opened portion 221a, which is a part of the closing portion 221, is removed along the half cut 222 together with the gas barrier film 225, thereby forming an opening in the closing portion 221. Thus, the gas barrier film 225 is prevented from remaining in the opening, thereby inhibiting the gas barrier film 225 from impeding smooth discharge of the contents.

(Modification)

Figure 7:
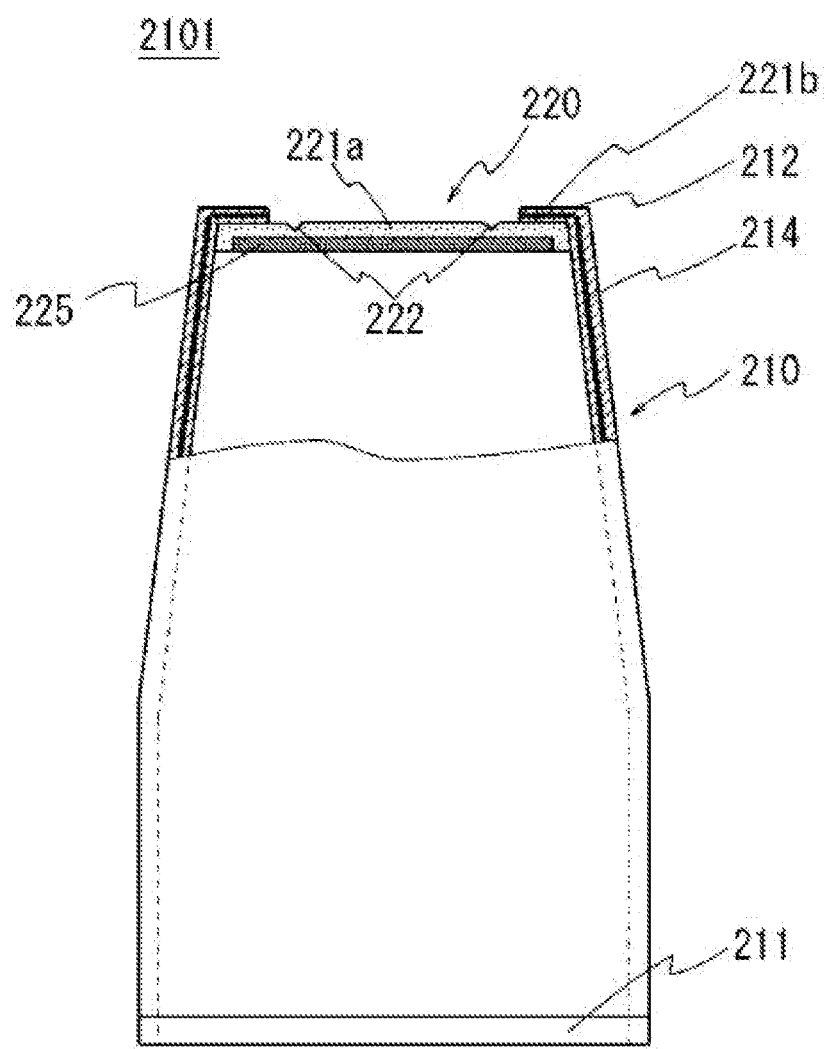
FIG. 7 is a cross-sectional view of a major part of a tubular container according to a modification of the second embodiment of the present invention.

FIG. 7 is a front view of a tubular container 2101 according to a modification of the second embodiment of the present invention. This tubular container 2101 is different from the tubular container 2100 in that the tubular container 2101 does not include the pick-up portion 223 and the peripheral wall 224. Since the tubular container 2101 does not include the pick-up portion 223, an opening can be formed by pushing the to-be-opened portion 221a toward the inside of the trunk portion 210.

The user may perform the work of pushing the to-be-opened portion 221a inward with a finger or the like, a pointed jig or the like, or a tubular member such as a straw through which the contents can be taken out. Meanwhile, for example, the tubular container 2101 may be housed in a rigid container in which the tubular container 2101 can be erected, and the to-be-opened portion 221a may be pushed inward by using a suction device such as a pump dispenser to suck the contents.

Also in the tubular container 2101, since the trunk portion 210 is adhered such that the gas barrier layer 214 and the gas barrier film 225 overlap each other, sealing property and gas barrier property before the first unsealing can be ensured. In addition, since a part of the closing portion 221 can be removed along the half cut 222, the gas barrier film 225 is prevented from remaining in the opening, thereby inhibiting the gas barrier film 225 from impeding smooth discharge of the contents.

Third Embodiment

According to the present embodiment, it is possible to provide a tubular container that can achieve both hermetical sealing before unsealing for the first time and hermetical sealing after resealing.

Figure 8:
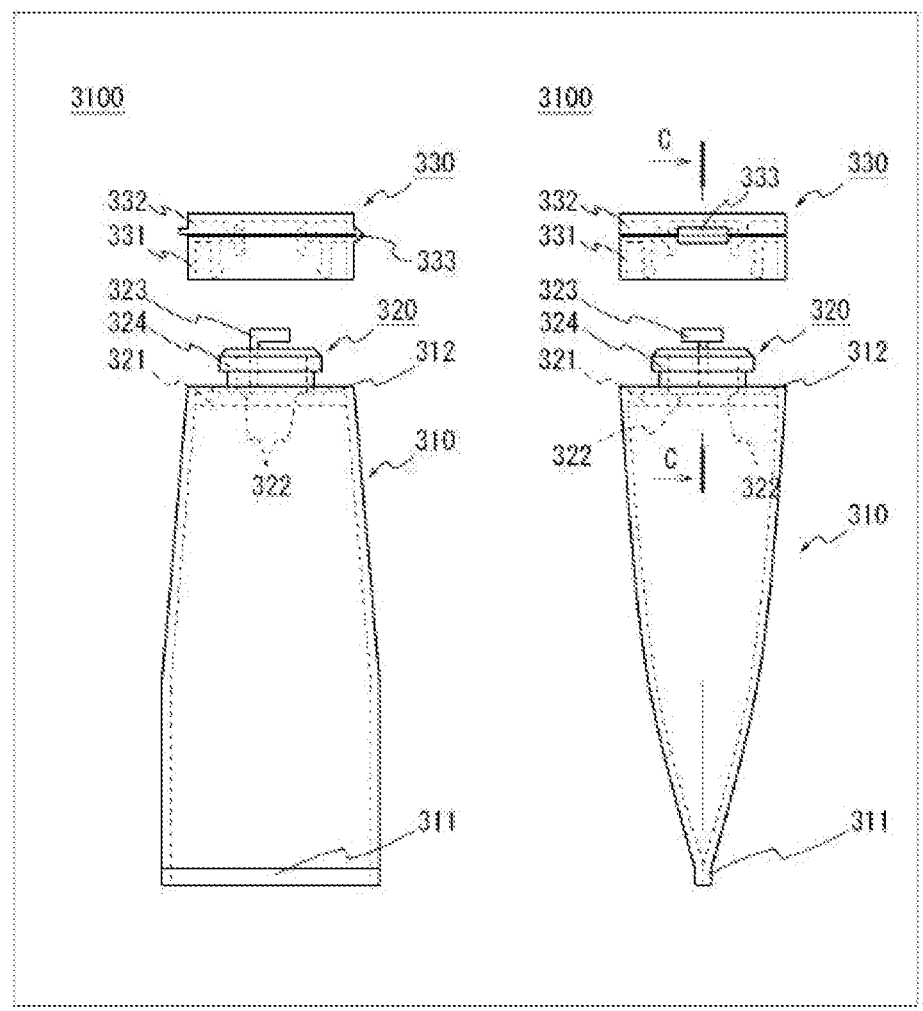
FIG. 8 shows a front view and a side view of a tubular container according to a third embodiment of the present invention.
Figure 9:
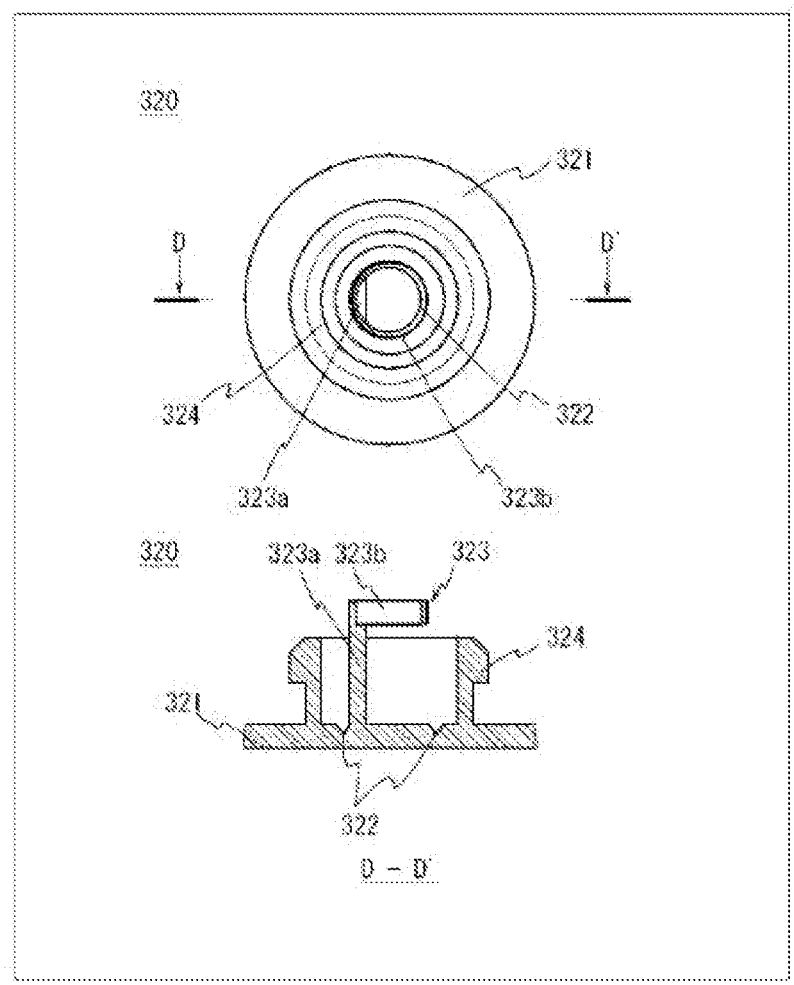
FIG. 9 shows a cross-sectional view and a plan view of a spout portion of the tubular container according to the third embodiment of the present invention.
Figure 10:
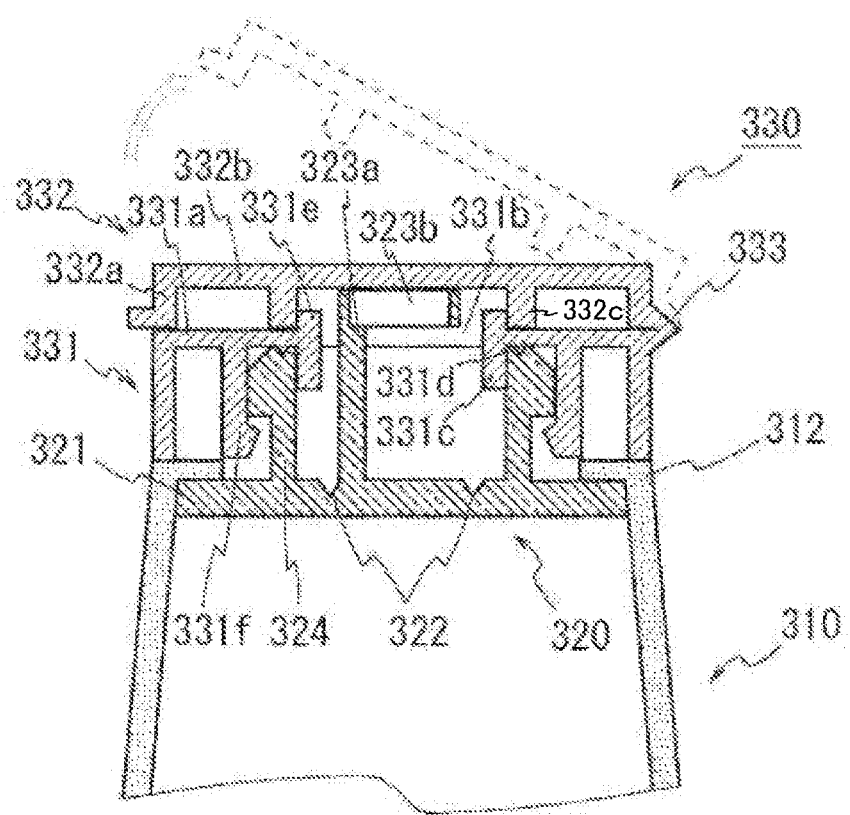
FIG. 10 is an enlarged cross-sectional view of a major part of the tubular container according to the third embodiment of the present invention.

A tubular container 3100 according to a third embodiment of the present invention includes a trunk portion 310 one end of which is closed, a spout portion 320 attached to the other end of the trunk portion 310, and a cap 330 attached to the spout portion 320. FIG. 8 shows a front view and a side view of the tubular container 3100. FIG. 9 shows a plan view of the spout portion 320 and a cross-sectional view cut along a D-D' line. FIG. 10 is an enlarged cross-sectional view, cut along a C-C line in FIG. 8, of the spout portion 320 to which the cap 330 is attached. FIG. 8 shows, for convenience sake, the spout portion 320 to which the cap 330 is not attached.

The trunk portion 310 is a tubular member that is formed of a soft material, has a closed bottom portion 311 located at one end thereof, and is able to store contents (not shown) therein. For example, the trunk portion 310 can be formed as follows. That is, after a film is shaped like a tube, opposed parts of the film at the bottom portion 311 are adhered to each other, and opposed parts of the film at the edges along the longitudinal direction (the up-down direction of the sheet of FIG. 8) of the trunk portion 310 are adhered to each other. The film adhering method is not particularly limited. For example, a method of providing the film with adhesive layers containing polyethylene, and heat-sealing these layers, can be adopted.

The spout portion 320 is a member that is attached to a top portion 312 located at the other end of the trunk portion 310 and is able to close the top portion 312 of the trunk portion 310. The spout portion 320 includes, for example, a plate-shaped closing portion 321 orthogonal to the longitudinal direction of the trunk portion 310. As shown in FIG. 9, the closing portion 321 has, for example, a circular-plate shape in a planar view. The shape of the closing portion 321 is not particularly limited, and may be an ellipse, an elongated circle, a polygon, or any other shape. The material of the spout portion 320 is not particularly limited, but a resin material such as straight-chain low-density polyethylene or low-density polyethylene can be preferably used. The spout portion 320 having the plate-shaped closing portion 321 can reduce the material to be used, as compared to the tapered spout portion according to the conventional art. The closing portion 321 may not necessarily have the plate shape orthogonal to the longitudinal direction of the trunk portion 310, and may have any shape as long as a half cut 322, a pick-up portion 323, and a peripheral wall 324 described later can be formed. The closing portion 321 may have a tapered shape having a shoulder portion the outer diameter of which decreases with an increasing distance from the top portion 312 of the trunk portion 310.

The closing portion 321 includes: an annular half cut 322 formed at substantially the center thereof; a pick-up portion 323 extending from an inner side of the half cut 322 toward a side opposite to the bottom portion 311 of the trunk portion 310; and a tubular peripheral wall 324 disposed outside the half cut 322 and extending toward the side opposite to the bottom portion 311 of the trunk portion 310.

The pick-up portion 323 is, for example, a pull ring including: a support portion 323a extending from the closing portion 321; and a ring portion 323b that is provided at an end, of the support portion 323a, on the side opposite to the spout portion 320, and allows the user to insert a finger therein. Since the closing portion 321 includes the half cut 322 and the pick-up portion 323, when the user of the tubular container 3100 pulls the pick-up portion 323 with a predetermined force, the user can remove a part of the closing portion 321 along the half cut 322, thereby forming an opening, in the closing portion 321, through which the contents can be taken out. As described above, in the tubular container 3100, the other end of the trunk portion 310 is closed by the spout portion 320, and a part of the closing portion 321 is removed to form an opening in the spout portion 320 when the tubular container 3100 is unsealed for the first time. Thus, the tubular container 3100 can be hermetically sealed before unsealing for the first time.

The pick-up portion 323 is not limited to a pull ring, and may have any shape as long as the user can remove a part of the closing portion 321 by pulling the same. For example, the pick-up portion 323 may be a plate-shaped pick-up margin extending from the closing portion 321.

As shown in FIGS. 8 and 10, at an edge (peripheral portion) of the closing portion 321, the top portion 312 of the trunk portion 310 is adhered to a surface, of the closing portion 321, on the side opposite to the bottom portion 311 of the trunk portion 310. The method of adhering the trunk portion 310 and the closing portion 321 is not particularly limited. For example, a method of forming an adhesive layer containing polyethylene on an innermost layer of the film, forming the spout portion 320 using a material containing polyethylene, and heat-sealing them, may be adopted.

The cap 330 is a member that is attached to the spout portion 320 and enables closing and opening of an opening formed in the spout portion 320. For example, the cap 330 is a hinge cap including: a tubular fixing portion 331 that can be attached and fixed to the spout portion 320; and a lid 332 pivotally attached to the fixing portion 331 via a hinge 333. The material of the cap 330 is not particularly limited, but a resin material such as polypropylene, polyethylene, or low-density polyethylene can be used. The fixing portion 331, the lid 332, and the hinge 333 can be integrally molded, for example.

The fixing portion 331 includes: a top plate 331a; a hole 331b formed in the top plate 331a to take out the contents; a first tubular inner ring 331c disposed on a surface, of the top plate 331a, on the side opposed to the spout portion 320 so as to surround the hole 331b; a contact ring 331d annually protruding from the top plate 331a on the outer peripheral side of the first inner ring 331c; and a second inner ring 331e disposed on a surface, of the top plate 331a, on the side opposed to the lid 332 so as to surround the hole 331b. The contents taken out from the opening of the spout portion 320 can be taken out from the tubular container 3100 through the hole 331b. The contact ring 331d and the second inner ring 331e are not essential.

As shown in FIG. 10, the first inner ring 331c is formed in a tubular shape so that it can be closely fitted to the inner peripheral surface of the peripheral wall 324 while being attached to the spout portion 320. The contact ring 331d is disposed in contact with an edge, of the peripheral wall 324, on the side opposite to the bottom portion 311 of the trunk portion 310 while being attached to the spout portion 320. The second inner ring 331e is formed such that an inner ring 332c of the lid 332 can be closely fitted to the outer peripheral surface thereof while the lid 332 closes the hole 331b as described later. The first inner ring 331c, the contact ring 331d, and the second inner ring 331e are formed such that the center axes thereof are aligned. The second inner ring 331e may be formed such that the inner ring 332c of the lid 332 can be closely fitted to the inner peripheral surface thereof.

In the tubular container 3100, for example, the first inner ring 331c and the second inner ring 331e of the fixing portion 331 have the center axes aligned with each other, and have the same outer circumferential diameter and the same inner circumferential diameter, as shown in FIG. 10. However, the first inner ring 331c and the second inner ring 331e may have different outer circumferential diameters and different inner circumferential diameters as long as the center axes thereof are aligned with each other. Specifically, the outer circumferential diameter and the inner circumferential diameter of the second inner ring 331e may be greater than those of the first inner ring 331c.

As shown in FIG. 10, the hole 331b of the fixing portion 331 is formed such that, in a planar view, the center thereof is aligned with the center of the opening formed in the spout portion 320. Therefore, as described later, the opening formed in the spout portion 320 can be closed and opened when the lid 332 closes and opens the hole 331b of the fixing portion 331.

The structure for fixing the fixing portion 331 to the spout portion 320 is not particularly limited. For example, as shown in FIG. 10, an engagement claw protruding outward is disposed at the tip of the peripheral wall 324 while the cap 330 is provided with a tubular engagement wall 331f having, at the tip thereof, an engagement claw protruding inward. The engagement wall 331f is fitted to the peripheral wall 324, and the engagement claws of the peripheral wall 324 and the engagement wall 331f are fitted to each other, thereby fixing the fixing portion 331 to the spout portion 320.

The lid 332 is a member that can be pivoted via the hinge 333 to cover and close the hole 331b of the fixing portion 331 as shown in FIG. 10. The lid 332 is composed of a peripheral wall 332a, a top plate 332b, and a tubular inner ring 332c. The inner ring 332c is disposed on the surface, at the inner peripheral side, of the top plate 332b so as to be closely fitted to the outer peripheral surface of the second inner ring 331e of the fixing portion 331 in the state where the lid 332 closes the hole 331b as shown in FIG. 10.

As described above, in the tubular container 3100, the cap 330 is provided with the first inner ring 331c that is closely fitted to the inner peripheral surface of the peripheral wall 324 of the spout portion 320. Therefore, even after formation of an opening in the spout portion 320, when the cap 330 is attached to the spout portion 320, the opening of the spout portion 320 can be hermetically resealed by the peripheral wall 324 and the first inner ring 331c. That is, in the tubular container 3100, since the closing portion 321 of the spout portion 320 used for hermetical sealing before unsealing for the first time, and the adhered portion between the first inner ring 331c and the peripheral wall 324 used for hermetical sealing after unsealing are located at different positions, these members are prevented from interfering with each other. Thus, it is possible to achieve both hermetical sealing before unsealing for the first time, and hermetical sealing after resealing.

The tubular container 3100 is provided with the contact ring 331d that is in contact with the edge, of the peripheral wall 324, on the side opposite to the bottom portion 311 of the trunk portion 310, while being attached to the spout portion 320. Therefore, when the tubular container 3100 is resealed, the opening of the spout portion 320 can be hermetically sealed more reliably by the peripheral wall 324 and the contact ring 331d.

Moreover, the tubular container 3100 is provided with the second inner ring 331e and the inner ring 332c of the lid 332 that are closely fitted to each other while the lid 332 closes the hole 331b. Therefore, when the tubular container 3100 is resealed, the opening of the spout portion 320 can be hermetically sealed more reliably by the second inner ring 331e and the inner ring 332c.

Moreover, in the tubular container 3100, the contents are not likely to enter the area surrounded by the peripheral wall 324 before unsealing for the first time. Therefore, it is not necessary to impart gas barrier property to the peripheral wall 324, and the adsorption amount of contents to the resin forming the peripheral wall 324 can be reduced.

As shown in FIG. 10, the inner circumferential diameter of the hole 331b for spouting provided in the fixing portion 331 of the cap 330 is preferably greater than the outer diameter of the half cut 322 and the outer diameter of the ring portion 323b of the pick-up portion 323. Thus, when an opening is formed in the closing portion 321 by use of the pick-up portion 323, the ring portion 323b can be easily picked up from the outside of the hole 331b of the fixing portion 331, and a removed part of the closing portion 321 can be easily taken out through the hole 331b. Therefore, the opening of the spout portion 320 can be easily formed without removing the cap 330 from the spout portion 320.

Furthermore, as shown in FIGS. 8 and 10, the pick-up portion 323 may be formed such that at least a part thereof is located outward of the top plate 331a of the fixing portion 331. This allows the pick-up portion 323 to be picked up more easily as compared to the case where the ring portion is located inward of the hole 331b. Thus, an opening can be formed in the spout portion 320 more easily.

(Modification)

Figure 11:
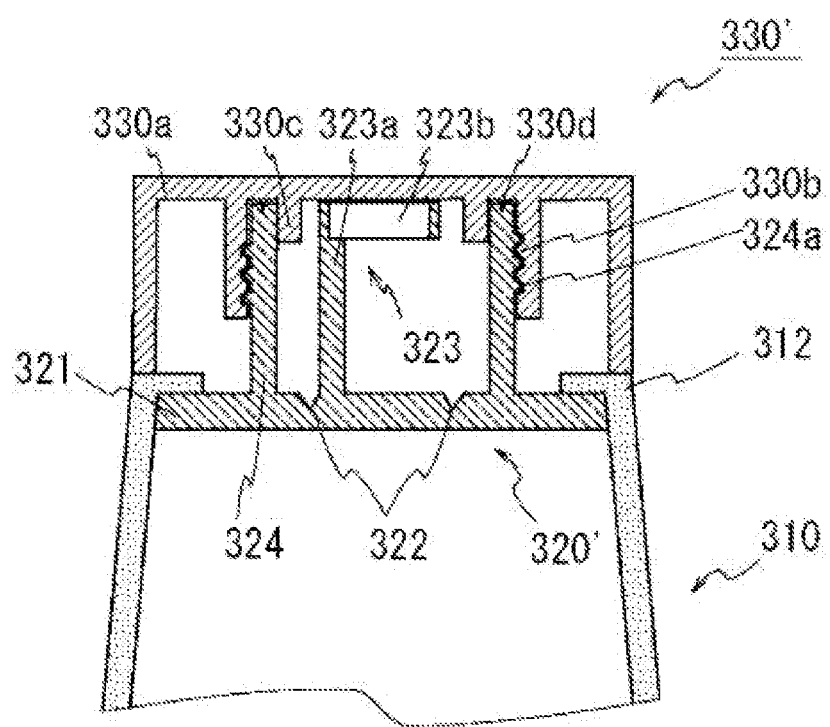
FIG. 11 is an enlarged cross-sectional view of a major part of a tubular container according to a modification of the third embodiment of the present invention.

The structure of the cap is not limited to a hinge cap as long as the cap is provided with an inner ring that can be closely fitted to the inner peripheral surface of the peripheral wall 324 while the cap is attached to the spout portion 320. For example, FIG. 11 shows a cap 330' of a tubular container 3101 according to a modification. The cap 330' is a screw cap that can be attached to the peripheral wall 324 in a thread-fitted manner. The cap 330' may include: an inner thread 330*b* fittable to an outer thread 324*a* formed at the outer peripheral surface of the peripheral wall 324; an inner ring 330*c* that is hanging from a top plate 330*a* and is closely fitted to the inner peripheral surface of the peripheral wall 324 when the cap 330' is attached to the spout portion 320; and a contact ring 330*d* that is in contact with an edge, of the peripheral wall 324, on the side opposite to the trunk portion 310.

Also in the tubular container 3101, when the pick-up portion 323 is pulled with a predetermined force, a part of the closing portion 321 is removed along the half cut 322 and thereby an opening is formed. In addition, as shown in FIG. 11, when the cap 330' is attached to the spout portion 320 with the inner thread 330*b* being fitted to the outer thread 324*a*, the inner ring 330*c* is closely fitted to the inner peripheral surface of the peripheral wall 324. Since hermetical sealing can be reliably achieved even after resealing, it is possible to achieve both hermetical sealing before unsealing for the first time, and hermetical sealing after resealing.

Fourth Embodiment

According to the present embodiment, it is possible to provide: a spout portion that has a high degree of freedom in choosing materials while having gas barrier property and that can be produced at reduced cost; and a tubular container using the spout portion.

Figure 12:
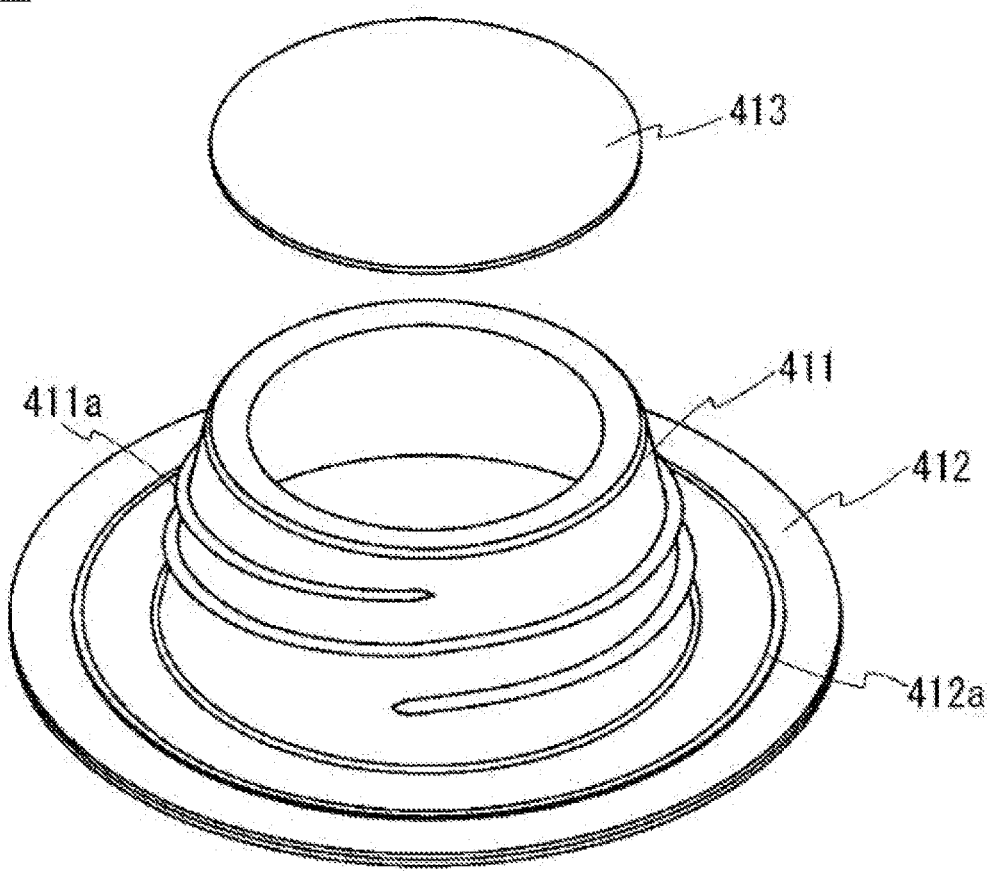
FIG. 12 is an exploded perspective view of a spout portion used in a tubular container according to a fourth embodiment of the present invention.
Figure 13:
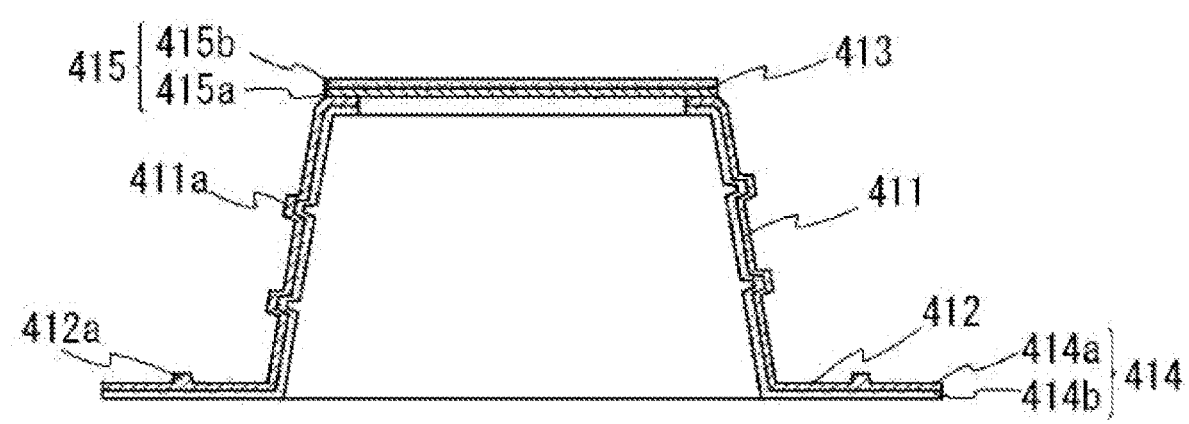
FIG. 13 is a vertical cross-sectional view of the spout portion used in the tubular container according to the fourth embodiment of the present invention.

A packaging container 4100 according to a fourth embodiment of the present invention is a tubular container including a container body 420 corresponding to the trunk portion described in the other embodiments, and a spout portion 410. The spout portion 410 includes a spouting tube portion 411, a flange portion 412, and a cap seal 413. FIG. 12 is an exploded perspective view of the spout portion 410, and FIG. 13 is a vertical cross-sectional view of the spout portion 410. The spout portion 410 is attached to the container body 420 when being used, as described later.

The spouting tube portion 411 is a tubular member serving as a spouting port when the contents stored in the container body are taken out. As described later, a cap (not shown) for resealing after unsealing of the spout portion 410 by removing the cap seal 413, may be attached to the spouting tube portion 411. For example, the spouting tube portion 411 has, at an outer peripheral surface thereof, a thread 411*a* to which the cap can be attached in a thread-engaged manner. The method of attaching the cap is not limited to the thread engagement. For example, fitting or the like may be adopted. If resealing is not intended, a cap need not be attached to the spouting tube portion 411.

The flange portion 412 is a member for attaching the spout portion 410 to the container body by welding. The flange portion 412 is formed extending outward from one end of the spouting tube portion 411. The flange portion 412 has, at a surface thereof, a projection 412*a* called an energy director. When ultrasonic welding is adopted, the projection 412*a* concentrates ultrasonic vibration to realize stable welding. The flange portion 412 has a circular plate shape, for example. However, as long as it extends outward from one end of the spouting tube portion 411, the flange portion 412 may have a tapered shape the outer diameter of which increases with an increasing distance from the other end of the spouting tube portion 411 in the axial direction.

The spouting tube portion 411 and the flange portion 412 are integrally formed by vacuum molding, vacuum/pressure molding, blow molding, or the like using a film-shaped first laminate 414. The first laminate 414 includes a first sealant layer 414*a* serving as an outer layer of the spouting tube portion 411, and a first gas barrier layer 414*b* having gas barrier property. The first laminate 414 can be formed by using a co-extrusion process or a heat lamination process, for example.

The first sealant layer 414*a* is formed by using, for example, polyethylene (PE), polyethylene terephthalate (PET) having heat sealability, cyclic polyolefin, EVOH sealant, or the like. The first gas barrier layer 14*b* is formed by using, for example, a transparent vapor-deposited film, aluminum foil, EVOH, or the like. The transparent vapor-deposited film is formed by vapor-depositing a thin layer of a metal such as aluminum, or a metal oxide such as alumina or silicon oxide, on a stretched or unstretched film of a plastic such as PET or nylon (NY).

According to a function required of the spout portion 410, the first laminate 414 may further include a layer formed by using polypropylene (PP), cyclic olefin polymer (COP), cyclic olefin copolymer (COC), or the like, in addition to the first sealant layer 414*a* and the first gas barrier layer 414*b*.

The cap seal 413 is a film member that is welded to the other end of the spouting tube portion 411 to close an opening at the other end of the spouting tube portion 411.

The cap seal 413 is formed by cutting a film-shaped second laminate 415 into a predetermined shape corresponding to the other end of the spouting tube portion 11. The second laminate 415 includes a second sealant layer 415*a* that can be welded to the first sealant layer 414*a*, and a second gas barrier layer 415*b* having gas barrier property. When the second sealant layer 415*a* is welded to the first sealant layer 414*a*, the cap seal 413 is fixed to the other end of the spouting tube portion 411. The second laminate 415 can be formed by using a co-extrusion process or a heat lamination process, for example.

The second sealant layer 415*a* can be welded to the first sealant layer 414*a*, and therefore is typically formed by using the same material as the first sealant layer 414*a*. However, the second sealant layer 415*a* may be formed by using a material different from that of the first sealant layer 414*a* as long as it can be welded to the first sealant layer 414*a*. For example, the second sealant layer 415*a* may be formed by using PE, PET having heat sealability, cyclic polyolefin, EVOH sealant, or the like. Meanwhile, the second gas barrier layer 415*b* is formed by using, for example, a transparent vapor-deposited film, aluminum foil, EVOH, or the like. The transparent vapor-deposited film is formed by vapor-depositing a thin layer of a metal such as aluminum, or a metal oxide such as alumina or silicon oxide, on a stretched or unstretched film of a plastic such as PET or nylon.

According to a function required of the spout portion 410, the second laminate 415 may further include a layer formed by using PP, COP, COC, or the like, in addition to the second sealant layer 415*a* and the first gas barrier layer 414*b*.

Unsealing of the spout portion 410 may be performed by partially or completely removing the cap seal 413 from the spouting tube portion 411, or by breaking through the cap seal 413 to partially form a hole.

As described above, the spout portion 410 formed by using the first laminate 414 including the first gas barrier layer 414*b* and the second laminate 415 including the second gas barrier layer 415b, has excellent gas barrier property. In addition, since a limitation regarding setting of strength, i.e., "being tearable", is not imparted to the first laminate 414 and the second laminate 415, the degree of freedom in choosing materials usable for producing the spout portion 410 is increased. Therefore, a spout portion 410, which can be suitably used for a packaging container to be subjected to sterilization treatment (retort sterilization, boil sterilization) using hot water, can be produced by using, for example, PP having high heat resistance for the first laminate 414 and second laminate 415.

Moreover, the first laminate 414 and the second laminate 415 can be produced by using a co-extrusion process, a heat lamination process, or the like, and the spouting tube portion 411 and the flange portion 412 can be produced by using vacuum molding, vacuum/pressure molding, blow molding, or the like. In this case, the spout portion 410 does not require complicated molds and processes as used in producing the spout portion of Japanese Laid-Open Patent Publication No. 2002-19814, and therefore can be produced at low cost.

Moreover, when the spout portion 410 is covered with the cap for resealing, the space between the spout portion 410 and the cap is narrower than that in the spout portion having a space for housing a pull ring as disclosed in Japanese Laid-Open Patent Publication No. 2002-19814. Therefore, even when the spout portion 410 is subjected to sterilization treatment using hot water, the degree of expansion/contraction of air remaining in the space can be reduced. Thus, deformation of the spouting tube portion 411 is inhibited. Moreover, the water used for the treatment is inhibited from entering the space through the gap between the cap and the spout portion 410.

Figure 14:
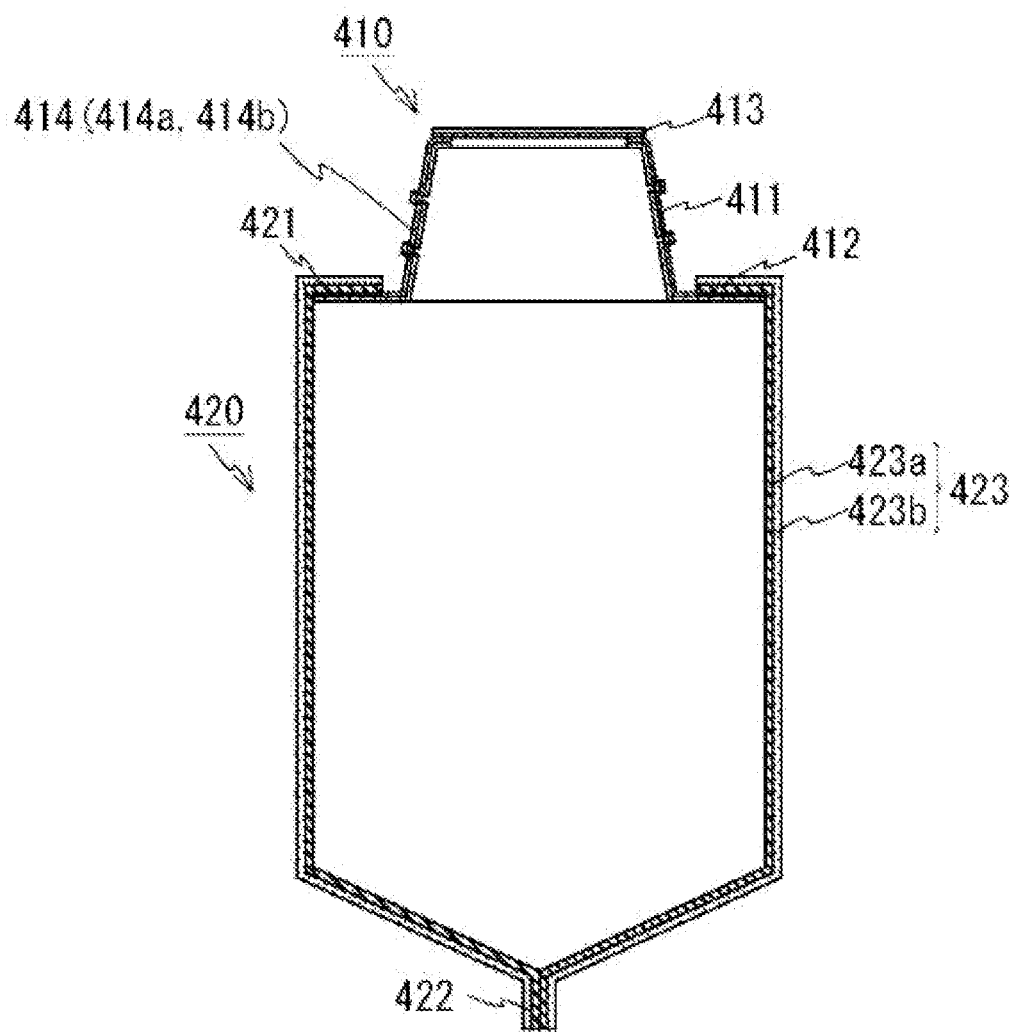
FIG. 14 is a vertical cross-sectional view of the tubular container according to the fourth embodiment of the present invention.

Next, a packaging container 4100 including a spout portion 410 will be described. The packaging container 4100 includes a spout portion 410 according to the above embodiment, and a container body 420. FIG. 14 is a vertical cross-sectional view of the packaging container 4100.

The container body 420 is formed by using a film-shaped third laminate 423, for example. The container body 420 is a tubular member, one end of which is closed, including a top portion 421 and a bottom portion 422. The third laminate 423 includes a third sealant layer 423a that can be welded to the first sealant layer 414a, and a third gas barrier layer 423b having gas barrier property.

The spout portion 410 is attached to the top portion 421 by welding the third sealant layer 423a to the first sealant layer 414a. The bottom portion 422 is formed by welding opposed third sealant layers 423a. As shown in FIG. 14, in the packaging container 4100, welding is performed in the state where the top portion 421 of the container body 420 covers the first sealant layer 414a as an outer layer of the spout portion 410, and the third sealant layer 423a as an inner layer of the third laminate 423 is in contact with the first sealant layer 414a. As long as the sealant layers respectively included in the spout portion 410 and the container body 420 can be in contact with each other, the layer configurations and the attachment manner are not limited Like the second sealant layer 415a, the third sealant layer 423a may be formed by using the same material as the first sealant layer 414a, or may be formed by using, for example, PE, PET having heat sealability, cyclic polyolefin, EVOH sealant, or the like. Meanwhile, the third gas barrier layer 423b may be formed by using, for example, a transparent vapor-deposited film, aluminum foil, EVOH, or the like. The transparent vapor-deposited film is formed by vapor-depositing a thin layer of a metal such as aluminum, or a metal oxide such as alumina or silicon oxide, on a stretched or unstretched film of a plastic such as PET or nylon.

As described above, both the spout portion 410 and the container body 420 forming the packaging container 4100 include the gas barrier layer having gas barrier property. This enables the entire packaging container 4100 to have excellent gas barrier property.

(Modification)

Next, a spout portion 410a used in a packaging container according to a modification of the fourth embodiment of the present invention will be described. The spout portion 410a is different from the spout portion 410 in that the flange portion 412 of the spout portion 410a includes a protection portion 416, that the spouting tube portion 411 includes a protection portion 417, and that the first sealant layer 414a is provided as both an innermost layer and an outermost layer of the spouting tube portion 411 and the flange portion 412. Like the spout portion 410, the spout portion 410a is attached to the container body 420 when being used. FIG. 15 is a vertical cross-sectional view showing the spout portion 410a and a part of a production process thereof. Specifically, an upper part of FIG. 15 shows a method of forming the protection portions 416, 417, and a lower part of FIG. 15 shows a completed spout portion 410a. For convenience sake, FIG. 15 shows the spout portion 410a to which the cap seal 413 is not attached.

The protection portions 416, 417 are provided for covering and protecting the cross section of the first laminate 414. More specifically, the protection portions 416, 417 are provided for inhibiting the contents from permeating the interface of each layer from the cross section of the first laminate 414.

FIG. 15 shows cross-sectional views illustrating an example of a formation method for the protection portions 416, 417. As shown in the upper part of FIG. 15, for example, each of the protection portions 416, 417 is formed such that an area of a predetermined width including the cross section of the first laminate 414 is folded back. After having been folded back, the cross section may be pressed and heated as shown by a black arrow. Thus, the innermost first sealant layer 414a and the outermost first sealant layer 414a are welded to each other. As a result, as shown in the lower part of FIG. 15, the cross section of the first laminate 414 is covered and protected by the first sealant layer 414a.

In the above description, the spout portion 410a is provided with both of the protection portions 416, 417. However, the spout portion 410a may be provided with only one of the protection portions 416, 417. As long as the cross section of the first laminate 414 can be satisfactorily covered with the first sealant layer 414a, the first sealant layer 414a need not be provided as both the innermost layer and the outermost layer, and the formation method for the protection portions 416, 417 is not limited.

Like the spout portion 410, the spout portion 410a is attached to the top portion 421 of the container body 420 by welding the third sealant layer 423a to the first sealant layer 414a as the outermost layer.

Spout portions according to Examples and spout portions according to Reference Examples were produced, and gas barrier properties thereof were measured.

EXAMPLES

As spout portions according to Examples, spout portions 410 according to the embodiment shown in FIGS. 12 and 13 were produced. The layer configuration of the first laminate 414 and the thicknesses of the respective layers were, in order from the outside, a first sealant layer 414a being 0.1 to 2.0 mm thick, and a first gas barrier layer 414b being 0.001 to 0.2 mm thick. The layer configuration of the second laminate 415 and the thicknesses of the respective layers were, in order from the outside, a second sealant layer 415a being 0.01 to 0.2 mm thick, and a second gas barrier layer 415b being 0.001 to 0.2 mm thick. The dimensions of the respective portions of the spout portion 410 were as follows. That is, the spouting tube portion 411 had an outer peripheral diameter of 3 to 50 mm and a height of 3 to 50 mm, the flange portion 412 had an outer peripheral diameter of 8 to 65 mm, and the cap seal 413 had an outer peripheral diameter of 3 to 50 mm. For each of these dimensions, a plurality of values including a maximum value and a minimum value within the aforementioned range were prepared, and a plurality of spout portions 410 were produced for every combination of the values.

(Reference Examples)

Spout portions according to Reference Examples, which were identical to the spout portions according to Examples except that the first laminate 414 and the second laminate 415 included no barrier layer, were produced.

For each of the spout portions, oxygen permeability was measured under conditions of 25° C. and 65% RH. A MOCON method was used as a measurement method.

(Measurement Results)

The oxygen permeabilities of the spout portions according to Examples were not greater than 3 cc/m$^2$/day/atm. Meanwhile, the oxygen permeabilities of the spout portions according to Reference Examples were 2,000 cc/m$^2$/day/atm. With the measurement results, it was confirmed that the spout portion according to the present embodiment has gas barrier property.

Fifth Embodiment

According to the present embodiment, it is possible to provide a tubular container that can suppress an increase in the thickness of the film to inhibit the contents from remaining inside the trunk portion, while allowing application of decoration or functionality to the film.

A tubular container 5100 according to a fifth embodiment of the present invention will be described with reference to the drawings. The tubular container 5100 includes a trunk portion 510 one end of which is closed, and a spout portion 520 attached to the other end of the trunk portion 510. The tubular container 5100 further includes, for example, a cap 530 to be attached to the spout portion 520.

Figure 16:
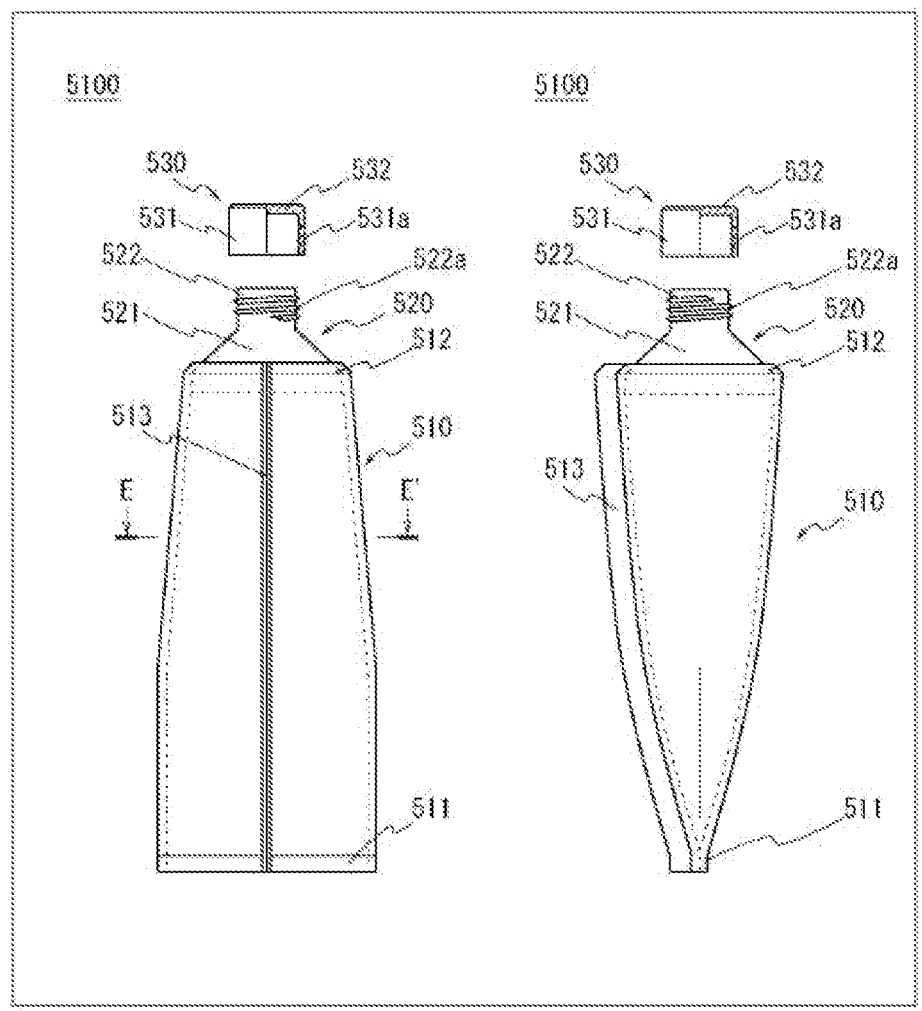
FIG. 16 shows a front view and a side view of a tubular container according to a fifth embodiment of the present invention.
Figure 17:
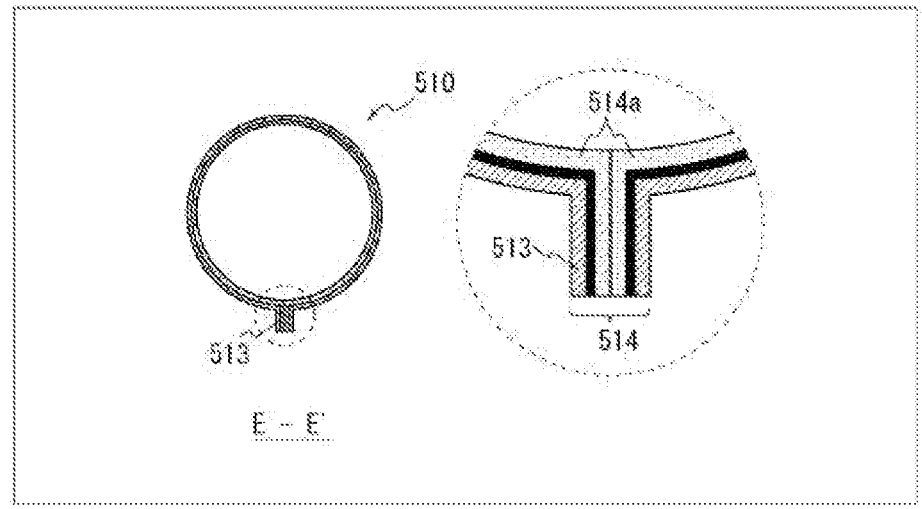
FIG. 17 shows a cross-sectional view and a partially enlarged view of a trunk portion of the tubular container according to the fifth embodiment of the present invention.

FIG. 16 shows a front view and a side view of the tubular container 5100. FIG. 17 shows a cross-sectional view of the trunk portion 510 cut along an E-E' line, and an enlarged view of a major part of the trunk portion 510. FIG. 16 shows, for convenience sake, the spout portion 520 to which the cap 530 is not attached.

(Trunk Portion)

The trunk portion 510 is a tubular member that has a closed bottom portion 511 at one end thereof, and is able to store contents (not shown) therein. The trunk portion 510 can be formed as follows. That is, a rectangular lamination film 514, which has an adhesive layer 514a containing an adhesive material as an innermost layer, is shaped like a tube. Then, opposed parts of the lamination film 514 at the bottom portion 511 are adhered to each other, and opposed parts of the lamination film 514 at the edges along the longitudinal direction of the trunk portion 510 are adhered to each other. As shown in FIGS. 16 and 17, a joint portion 513 is formed by making parts of the adhesive layer 514a at the edges along the longitudinal direction of the trunk portion 510 face each other, and adhering the facing parts. The joint portion 513 has a band shape extending along the longitudinal direction on the surface of a tubular portion of the trunk portion 510.

Figure 18:
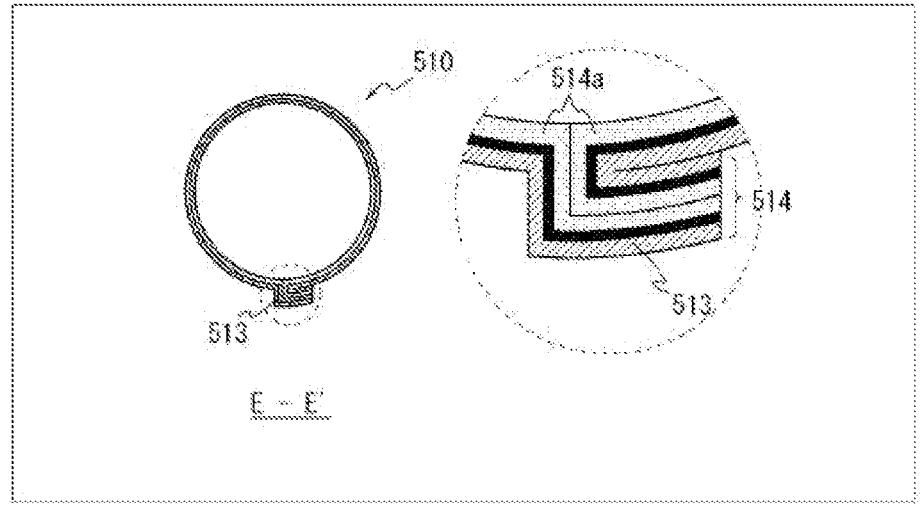
FIG. 18 shows a cross-sectional view and a partially enlarged view of the trunk portion of the tubular container according to the fifth embodiment of the present invention.

As shown in FIGS. 16 and 17, in the tubular container 5100, the joint portion 513 is formed extending outward from the surface of the tubular portion of the trunk portion 510. However, the joint portion 513 may be adhesively fixed to the surface of the tubular portion. Specifically, as shown in a cross-sectional view of FIG. 18, at a position where the joint portion 513 is in contact with the tubular portion of the trunk portion 510, the joint portion 513 may be bent along the surface of the trunk portion 510 and adhered to the surface of the trunk portion 510. Therefore, when the user holds and uses the tubular container 5100, the joint portion 513 extending from the surface of the trunk portion 510 is prevented from touching the hand or the like and hindering the use.

The method of adhering the joint portion 513 to the surface of the trunk portion 510 is not particularly limited. For example, heat-seal welding using an adhesive material such as polyethylene or heat-sealable polyethylene terephthalate partially laminated on the surfaces of the joint portion 513 and the trunk portion 510, may be adopted. Alternatively, an adhesion process using a hot-melt adhesive or a heat-seal varnish partially laminated on the surface of at least one of the joint portion 513 and the trunk portion 510, may be adopted.

The layer configuration of the lamination film 514 is not limited as long as the lamination film 514 includes the adhesive layer 514a as an innermost layer. For example, the lamination film 514 may be formed by laminating, from the adhesive layer 514a side, a polyethylene layer (50 µm), an aluminum foil layer (15 µm), an ink layer, and a polyethylene terephthalate layer (12 µm). Since the polyethylene terephthalate layer is disposed as an outermost layer, the outermost layer is less likely to be damaged and is more lustrous as compared to the case where a polyethylene layer is disposed as an outermost layer of the trunk portion 510. A paper layer may be disposed as an outermost layer of the lamination film 514. In this case, the texture of the trunk portion 510 can be enhanced, and the amount of resin can be reduced. Moreover, according to a function required of the tubular container 5100, a layer implementing the function may be further added as appropriate.

The material and the adhering method of the adhesive layer 514a of the lamination film 514 are not particularly limited, but heat sealing using polyethylene or polypropylene is simple and therefore preferable.

(Spout Portion)

The spout portion 520 is a member that is attached to a top portion 512 located at the other end of the trunk portion 510 and is able to close the top portion 512 of the trunk portion 510. For example, the spout portion 520 includes: a tapered portion 521 which is attached to the top portion 512 of the trunk portion 510, and the outer diameter of which decreases with an increasing distance from the trunk portion 510; and a cylindrical portion 522 contiguous to the tapered portion 521. An outer thread 522a is formed at the outer peripheral surface of the cylindrical portion 522, and an opening of the cylindrical portion 522 can be closed when the cap 530 is thread-fitted to the outer thread 522a. The material of the spout portion 520 is not particularly limited, but a resin material such as low-density polyethylene can be preferably used.

As shown in FIG. 16, at an edge (peripheral portion) of the tapered portion 521, the top portion 512 of the trunk portion 510 is adhered to the surface, of the tapered portion 521, on the side opposite to the one end of the trunk portion 510. The method of adhering the trunk portion 510 and the spout portion 520 is not particularly limited, but heat sealing may be adopted, for example.

(Cap)

The cap 530 is a member that is attached to the spout portion 520 and enables closing and opening of an opening formed in the cylindrical portion 522. For example, the cap 530 includes a cylindrical side wall 531, and a top plate 532 that covers one end of the side wall 531. An inner thread 531a engageable with the outer thread 522a of the cylindrical portion 522 is formed at the inner peripheral surface of the side wall 531. The material of the cap 530 is not particularly limited, but a resin material such as polypropylene, polyethylene, or low-density polyethylene can be used.

The configurations of the spout portion 520 and the cap 530 are not limited to the present embodiment. For example, the cap 530 may be a hinge cap including a fixing portion attachable to the spout portion 520, and a cap portion pivotally attached to the fixing portion via a hinge.

As described above, in the tubular container 5100, an adhesive layer is not provided as an outermost layer, and the parts of the adhesive layer 514a as an innermost layer at the edges of the lamination film 514 are made to face each other to form the joint portion 513, whereby the trunk portion 510 is formed into a tubular shape. Therefore, the rigidity of the trunk portion 510 formed by using the lamination film 514 is inhibited from increasing, and the trunk portion 510 can be squeezed more easily to discharge the contents. As a result, the contents are inhibited from remaining in the trunk portion 510.

Moreover, the lamination film 514 need not be provided with an adhesive layer as an outermost layer, and therefore has less limitation on the layer configuration. Thus, materials can be selected with a high degree of freedom according to required decorations and functions.

Since the rigidity of the trunk portion 510 is inhibited from increasing, the "air back" phenomenon, i.e., back flow of the contents into the trunk portion 510 when the load for squeezing the trunk portion 510 is released and thereby the trunk portion 510 is restored to the original shape, is less likely to occur. Therefore, it is not necessary to make the contents easy to be squeezed out by, for example, storing the tubular container 5100 upside down so as to gather the contents to the periphery of the spout portion 520. Thus, the contents can be easily squeezed out regardless of the position of the contents.

Moreover, since the trunk portion 510 is formed in a tubular shape by forming the joint portion 513, the tubular container 5100 can be produced by using a packaging bag producing apparatus for pillow packaging bags, stick packaging bags, or the like without using a molding apparatus dedicated to laminated tubes.

First Modification

Figure 19:
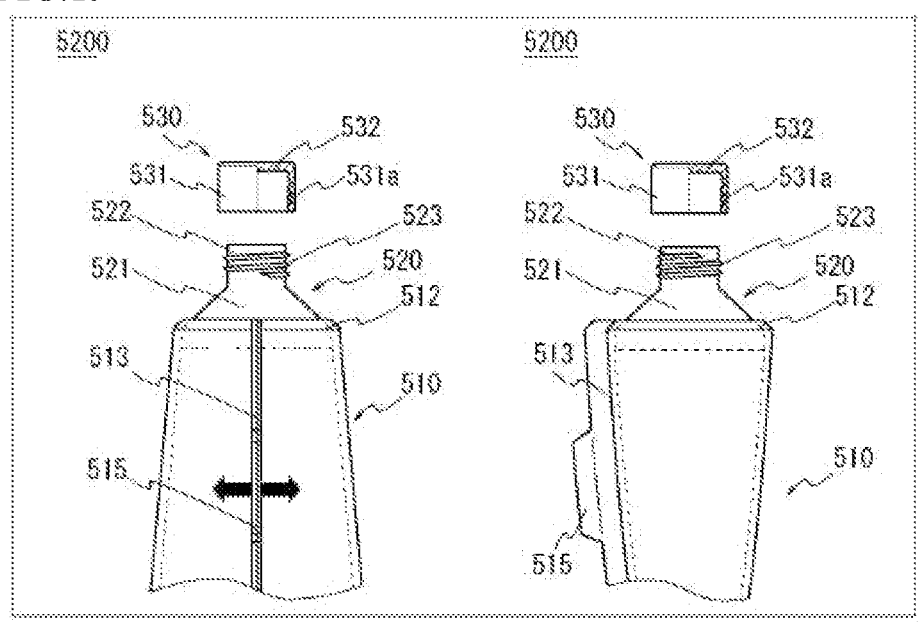
FIG. 19 shows a front view and a side view of a tubular container according to a first modification of the fifth embodiment of the present invention.

FIG. 19 shows a partial front view and a partial side view of a tubular container 5200 according to a first modification of the fifth embodiment. The tubular container 5200 is obtained by providing the tubular container 5100 with tabs 515.

As shown in FIG. 19, the joint portion 513 of the tubular container 5200 has tabs 515 extending from the end parts of the adhered lamination films 514. The tabs 515 are not adhered to each other. For example, a pair of tabs 515 is provided.

When the user holds the tabs 515 and applies force in directions (directions indicated by black arrows in FIG. 19) of opening the joint portion 513, the user can separate the joint portion 513. Therefore, when the residual amount of contents becomes small along with the use of the tubular container 5200 and it is difficult to squeeze out the contents, the user can separate the joint portion 513 by using the tabs 515 to open the trunk portion 510. Thus, the contents attached on the inner surface of the trunk portion 510 can be taken out, thereby further preventing the contents from remaining in the trunk portion 510.

The joint portion 513 having the tabs 515 may also be adhered to the trunk portion 510 together with the tabs 515, as described above.

Second Modification

Figure 20:
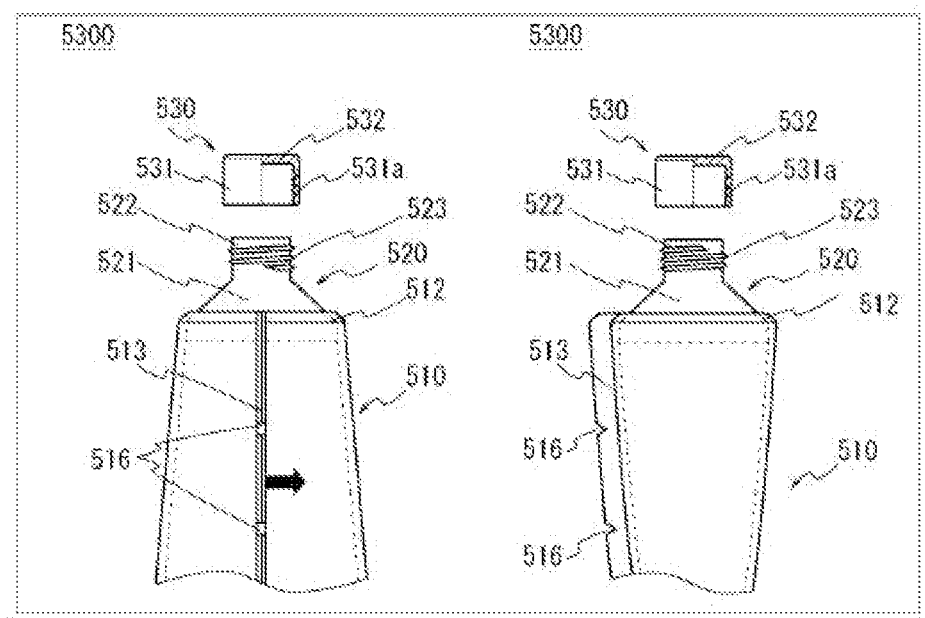
FIG. 20 shows a front view and a side view of a tubular container according to a second modification of the fifth embodiment of the present invention.

FIG. 20 shows a partial front view and a partial side view of a tubular container 5300 according to a second modification of the fifth embodiment. The tubular container 5300 is obtained by providing the tubular container 5100 with notches 516.

As shown in FIG. 20, the joint portion 513 of the tubular container 5300 has notches 516 at the end parts of the joined lamination films 514. For example, the joint portion 513 has two notches 516 at a predetermined interval. Each notch 516 is a cutout as shown in FIG. 20, but may just be a cut. The number of the notches 516 is not limited as long as the notches 516 enable breakage of the lamination film 514 as described later.

When the user holds the joint portion 513 and applies force in the circumferential direction of the trunk portion 510, the user can break the lamination film 514 of the trunk portion 510 from the notches 516. Therefore, when the residual amount of contents becomes small along with the use of the tubular container 5300 and it is difficult to squeeze out the contents, the user can tear the trunk portion 510 by using the notches 516 and take out the contents attached on the inner surface of the trunk portion 510. Thus, the contents can be further prevented from remaining in the trunk portion 510.

The joint portion 513 having the notches 516 may also be adhered to the trunk portion 510, as described above.

Third Modification

Figure 21:
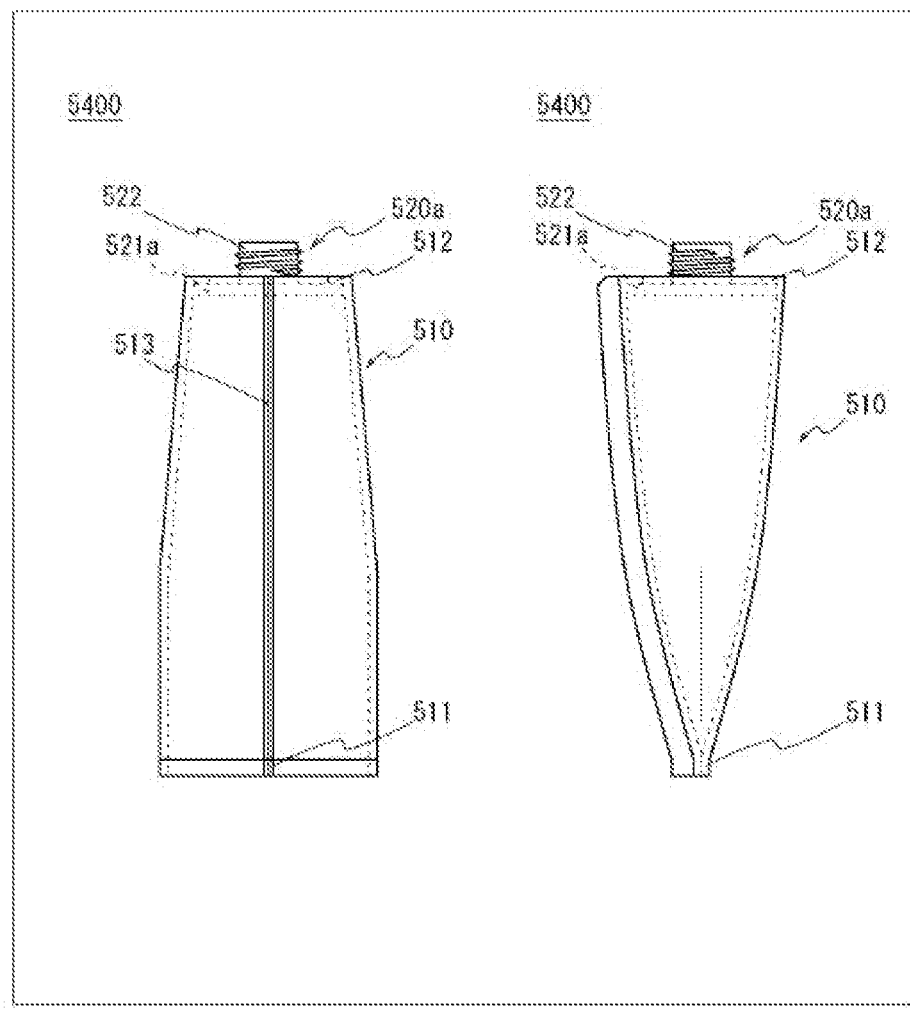
FIG. 21 shows a front view and a side view of a tubular container according to a third modification of the fifth embodiment of the present invention.

A tubular container 5400 according to a third modification of the fifth embodiment of the present invention will be described with reference to the drawings. Differences from the tubular container 5100 will be mainly described. The tubular container 5400 includes a trunk portion 510 one end of which is closed, and a spout portion 520a attached to the other end of the trunk portion 510. Like the tubular container 5100, the tubular container 5400 may further include a cap 530 to be attached to the spout portion 520a. FIG. 21 shows a front view and a side view of the tubular container 5400, and FIG. 22 shows a side view of the spout portion 520a.

Figure 22:
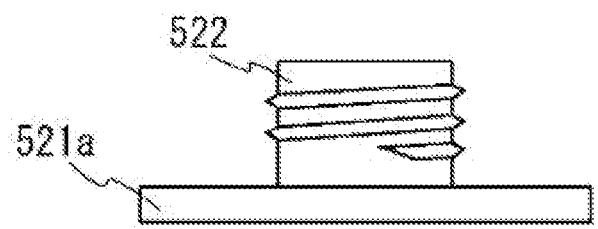
FIG. 22 is a cross-sectional view of a trunk portion of the tubular container according to the third modification of the fifth embodiment of the present invention.

The tubular container 5400 is different from the tubular container 5100 in the shape of the spout portion 520a, as shown in FIGS. 21 and 22. Specifically, the spout portion 520a has, instead of the tapered portion 521 of the spout portion 520, a plate-shaped closing portion 521a orthogonal to the longitudinal direction of the trunk portion 510. At an edge of the closing portion 521a, the other end of the trunk portion 510 is adhered to a surface, of the closing portion 521a, on the side opposite to the one end of the trunk portion 510.

Figure 23:
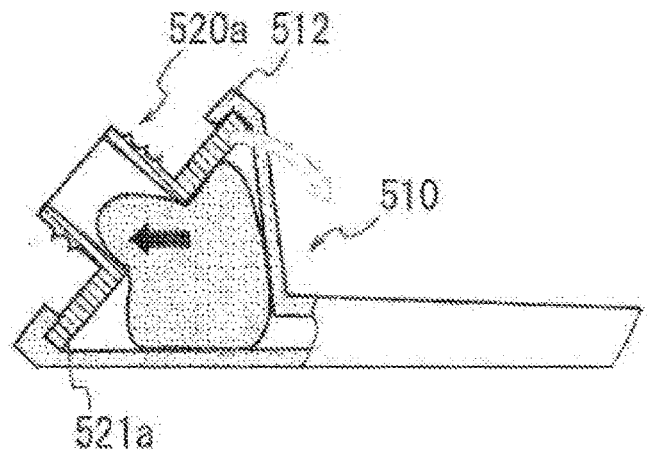
FIG. 23 is a cross-sectional view of the trunk portion of the tubular container according to the third modification of the fifth embodiment of the present invention.

FIG. 23 is a cross-sectional view illustrating the state of the tubular container 5400 when a small amount of contents remaining in the trunk portion 510 is taken out. In the tubular container 5400, the spout portion 520a includes the plate-shaped closing portion 521a orthogonal to the longitudinal direction of the trunk portion 510, and the top portion 512 of the trunk portion 510 is, at the edge of the closing portion 521a, adhered to the surface, of the closing portion 521a, on the side opposite to the bottom portion 511 of the trunk portion 510. Therefore, as shown in FIG. 23, when the trunk portion 510a is bent at the edge of the closing portion 521a with a finger or the like, a small amount of contents remaining in the trunk portion 510 is pushed toward the periphery of the opening of the spout portion 520a while being sandwiched by the inner-side surface of the closing portion 521a and the inner surface of the trunk portion 510.

Moreover, the closing portion 521a of the spout portion 520a has a plate shape, and therefore does not have a space that allows the contents to remain on the inner side, in contrast to the tapered spout portion. Therefore, the contents pushed toward the periphery of the opening of the spout portion 520a can be squeezed out from the opening without being remained inside the trunk portion 510 and the spout portion 520a. As a result, remaining of the contents inside the container can be inhibited.

Therefore, according to the tubular container 5400 in which the spout portion 520a is attached to the trunk portion 510 provided with the joint portion 513 that prevents remaining of the contents, remaining of the contents can be further inhibited.

The trunk portion 510 of the tubular container 5400 may be provided with the tabs 515 or the notches 516.

Fourth Modification

Figure 24:
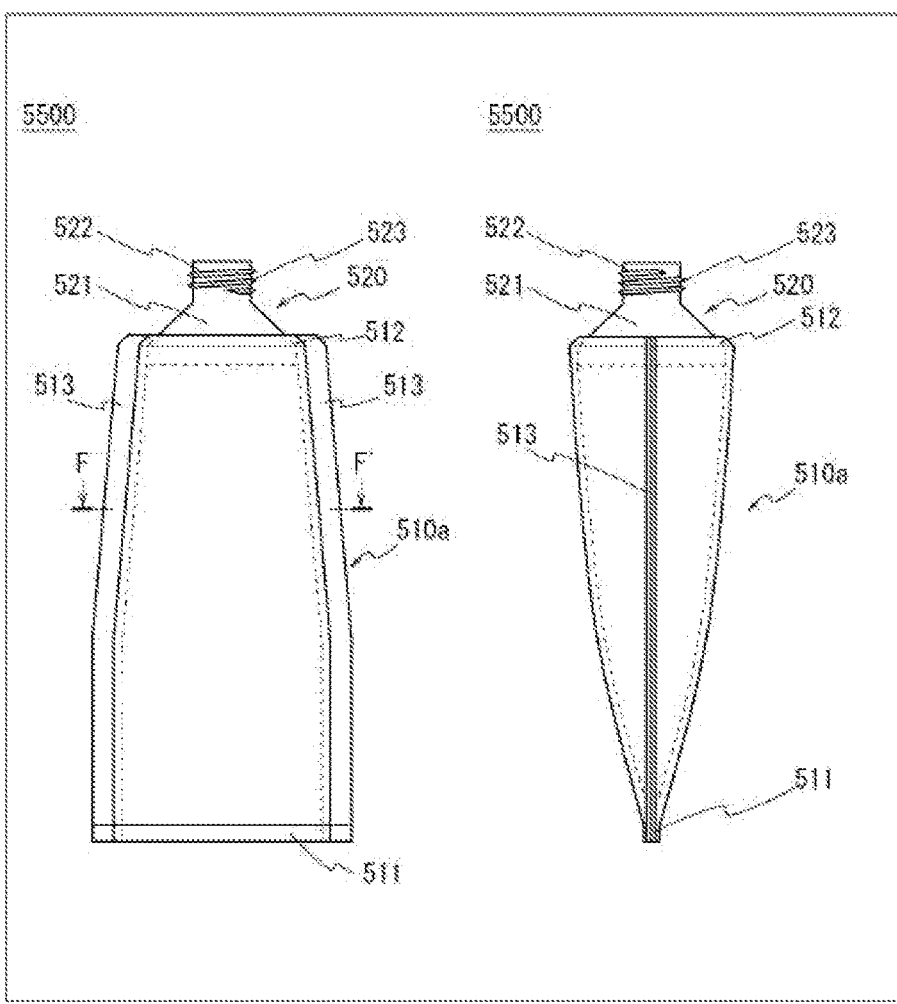
FIG. 24 shows a front view and a side view of a tubular container according to a fourth modification of the fifth embodiment of the present invention.

A tubular container 5500 according to a fourth modification of the fifth embodiment of the present invention will be described with reference to the drawings. Differences from the tubular container 5100 will be mainly described. The tubular container 5500 includes a trunk portion 510a one end of which is closed, and a spout portion 520 attached to the other end of the trunk portion 510a. Like the tubular container 5100, the tubular container 5500 may further include a cap 530 to be attached to the spout portion 520. FIG. 24 shows a front view and a side view of the tubular container 5500, and FIG. 25 shows a cross-sectional view of the trunk portion 510a cut along an F-F' line.

Figure 25:
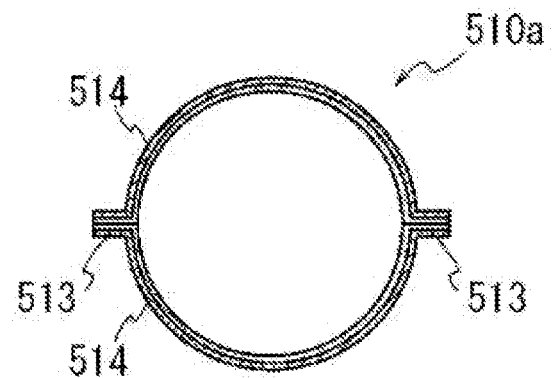
FIG. 25 is a cross-sectional view of a trunk portion of the tubular container according to the fourth modification of the fifth embodiment of the present invention.

The tubular container 5500 is different from the tubular container 5100 in that the trunk portion 510a has two joint portions 513 as shown in FIGS. 24 and 25. Specifically, the trunk portion 510a is formed such that innermost layers at the edges of two lamination films 514 are made to face each other and are adhered to each other, thereby providing two joint portions 513.

The two lamination films 514 forming the trunk portion 510a may have the same layer configuration or different layer configurations as long as each film 514 includes the adhesive layer 514a as an innermost layer. When the two lamination films 514 forming the trunk portion 510a have different layer configurations, various functions can be imparted to the tubular container 5500. Hereinafter, specific examples of layer configurations of the lamination film 514 and functions achieved by using the lamination films 514 of the respective layer configurations, will be described. The layer configurations described below are merely examples. The layer configurations of the two lamination films 514 are not limited as long as the effects of the specific examples below can be achieved, and more layers may be added as appropriate.

Specific Example 1

In a tubular container 5500 according to Specific Example 1, one of the two lamination films 514 forming the trunk portion 510a has a low rigidity such that the contents are easily discharged by squeezing a part of the trunk portion 510a, while the other lamination film 514 has a certain rigidity such that the shape of the trunk portion 510a is kept even when the residual amount of contents is small.

The layer configurations of the two lamination films 514 used in the tubular container 5500 according to Specific Example 1 are as follows. For example, one of the lamination films 514 includes polyethylene terephthalate (PET) (12 μm), nylon (NY) (15 μm), and polyethylene (PE) (100 μm) while the other lamination film 514 includes PET (24 μm), NY (25 μm), and PE (100 μm), in order from the outer side of the trunk portion 510a. Alternatively, one of them may include PET (12 pin), NY (15 μm), and PE (100 μm) while the other may include PE (20 μm), paper (200 g/m²), and PE (100 μm), in order from the outer side of the trunk portion 510a.

Specific Example 2

In the tubular container 5500 according to Specific Example 2, the other one of the two lamination films 514 forming the trunk portion 510a has minute irregularities at the surface thereof. This allows the tubular container 5500 to change the texture at a part of the surface of the trunk portion 510 (i.e., between the one and the other lamination films 514). Thus, the tubular container 5500 is interesting, is tactually distinguishable from other containers, and has high designability, that is, the appearance of the trunk portion 510a being partially changed at the surface thereof.

The layer configurations of the two lamination films 514 used in the tubular container 5500 according to Specific Example 2 are as follows. For example, one of them includes PET (12 μm), NY (15 μm), and PE (100 μm) while the other includes PET (12 μm) embossed at the outer surface, NY (15 μm), and PE (100 μm), in order from the outer side of the trunk portion 510a. Alternatively, one of them may include PET (12 μm), NY (15 μm), and PE (100 μm) while the other may include a textile (woven fabric or cloth) or a nonwoven fabric, a gas barrier layer, and PE (100 μm), in order from the outer side of the trunk portion 510a. The gas barrier layer may not necessarily be provided.

Specific Example 3

In a tubular container 5500 according to Specific Example 3, one of the two lamination films 514 forming the trunk portion 510a has been subjected to printing, while the other lamination film 514 has been subjected to vapor deposition of aluminum. Thus, the tubular container 5500 has high designability, that is, the print being exhibited by the metallic luster.

The layer configurations of the two lamination films 514 used in the tubular container 5500 according to Specific Example 3 are as follows. For example, one of them includes PET (12 μm), NY (15 μm), and PE (100 μm) while the other includes aluminum-deposited PET (VM-PET) (12 μm), NY (15 μm), and PE (100 μm), in order from the outer side of the trunk portion 510a. The other lamination film 514 can be subjected to printing.

Specific Example 4

In a tubular container 5500 according to Specific Example 4, the other one of the two lamination films 514 forming the trunk portion 510a has air permeability. Thus, the tubular container 5500 inhibits the inner air pressure from increasing to a predetermined value or more. Moreover, the tubular container 5500, after filled with contents, allows the contents to be externally subjected to gas sterilization.

The layer configurations of the two lamination films 514 used in the tubular container 5500 according to Specific Example 4 are as follows. For example, one of them includes PET (12 μm), NY (15 μm), and PE (100 μm) while the other is a sheet member (160 μm) having air permeability. As the sheet member having air permeability, Tyvek (registered trademark) can be used, for example.

In the tubular container 5500, the two joint portions 513 are provided at opposed positions in the circumferential direction of the trunk portion 510a, for example. The two joint portions 513 provided at the opposed positions in the circumferential direction of the trunk portion 510a allow the tubular container 5500 to appear larger than that in the case of one joint portion 513, thereby enhancing designability.

Figure 26:
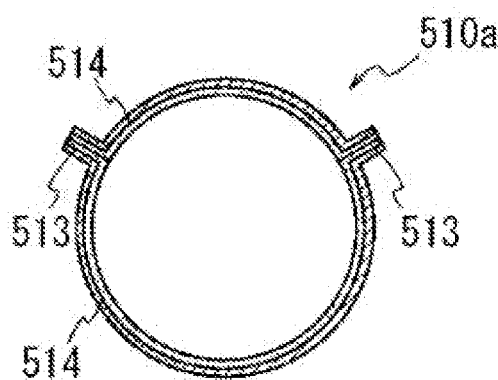
FIG. 26 is a cross-sectional view of the trunk portion of the tubular container according to the fourth modification of the fifth embodiment of the present invention.

As shown in FIG. 26, the two joint portions 513 may be provided at positions not opposed to each other in the circumferential direction of the trunk portion 510a. The number of the joint portions 513 provided in the trunk portion 510a is not limited to two, and may be three or more. Also in this case, the trunk portion 510a is formed such that the innermost layers at the edges of the three or more lamination films 514 are made to face each other and are adhered to each other. The lamination films 514 may have the same layer configuration or different layer configurations. Moreover, the joint portions 513 may be adhesively fixed to the surface of the trunk portion 510a.

The tubular container 5500 in which the spout portion 520 is attached to the other end of the trunk portion 510a has been described above. However, the tubular container 5500 may include the spout portion 520a according to the third modification, instead of the spout portion 520. Moreover, the trunk portion 510a may include the tabs 515 or the notches 516. Moreover, any of the trunk portions 510 and 510a used in the tubular containers 5100 to 5500 according to the fifth embodiment can be attached to any of the spout portions of the tubular containers according to the first to fourth embodiments.

Tubular containers according to Example and Reference Example were produced, and the amounts of remaining contents were compared and evaluated.

EXAMPLE

As a tubular container according to Example, a tubular container 5100 was produced. The layer configuration of a lamination film was, from the innermost layer side, a polyethylene layer (50 μm) and a polyethylene terephthalate layer (12 μm).

Reference Example

As a tubular container according to Reference Example, a tubular container in which only the layer configuration of the lamination film was changed from that of Example, was produced. The layer configuration of the lamination film was, from the innermost layer side, a polyethylene layer (100 μm), an EVOH layer (20 μm), and a polyethylene layer (100 μm).

After each of the produced tubular containers was filled with mustard paste, the mustard paste was squeezed out with the same load, and the amount of mustard paste remaining in each trunk portion was measured.

As a result, in the tubular container according to Reference Example, gaps were formed at folded lines, of the lamination film, located at the opposed ends in the width direction of the trunk portion, and the contents remained in these spaces. On the other hand, in the tubular container according to Example, gaps were hardly formed at the opposed ends in the width direction of the trunk portion, and therefore, the amount of remaining contents was very small. Moreover, in the tubular container according to Example, when a part of the trunk portion was inserted into the tapered portion of the spout portion, even the contents remaining inside the tapered portion could be squeezed out. However, in the tubular container according to Reference Example, since the rigidity of the trunk portion was high, the contents remaining inside the tapered portion could not be squeezed out.

As a result, the amount of contents remaining in the tubular container according to Example was half the amount of contents remaining in the tubular container according to Reference Example. Thus, it was confirmed that the tubular container according to Example inhibited the contents from remaining inside the trunk portion.

Sixth Embodiment

According to the present embodiment, it is possible to provide a tubular container that does not require highly accurate alignment for welding of the trunk portion to the spout portion, and therefore can be easily produced.

A tubular container 6100 according to a sixth embodiment of the present invention will be described with reference to the drawings. The tubular container 6100 includes a trunk portion 610 having a closed bottom portion 611 at one end thereof, and a spout portion 620 attached by welding to a top portion 612 at the other end of the trunk portion 610. The tubular container 6100 is typically used with a cap (not shown) being attached to the spout portion 620.

Figure 27:
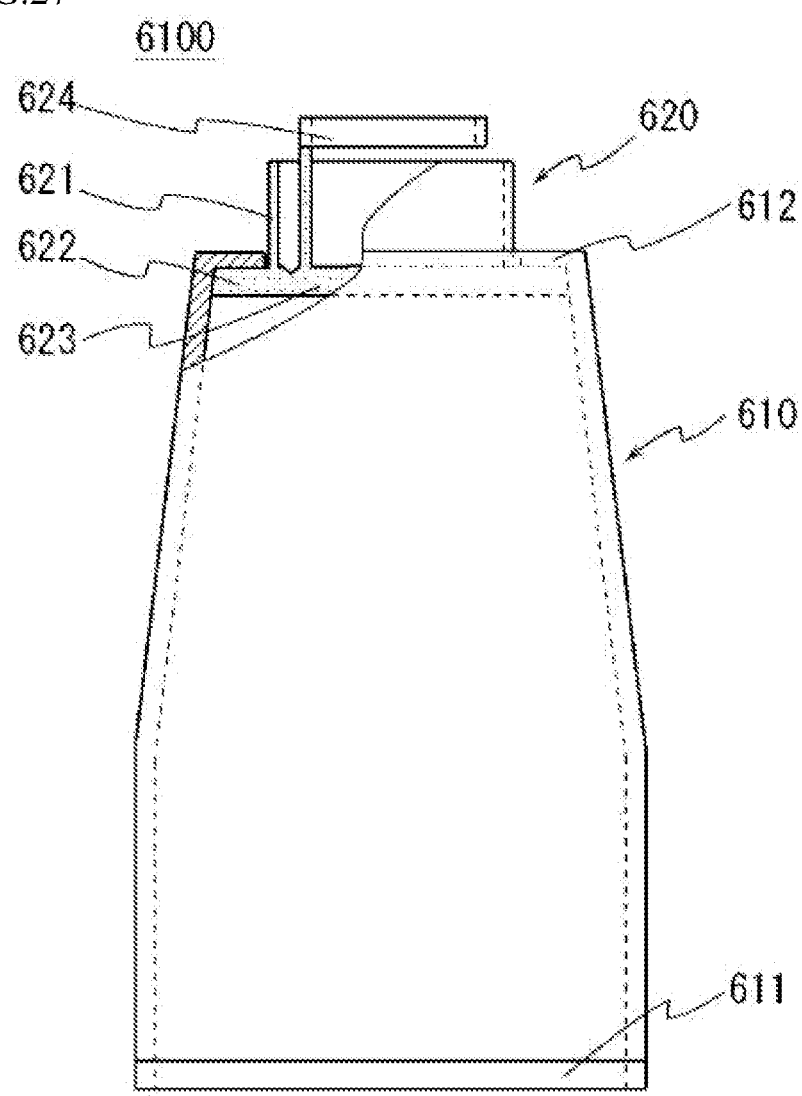
FIG. 27 is a front view of a tubular container according to a sixth embodiment of the present invention.
Figure 28:
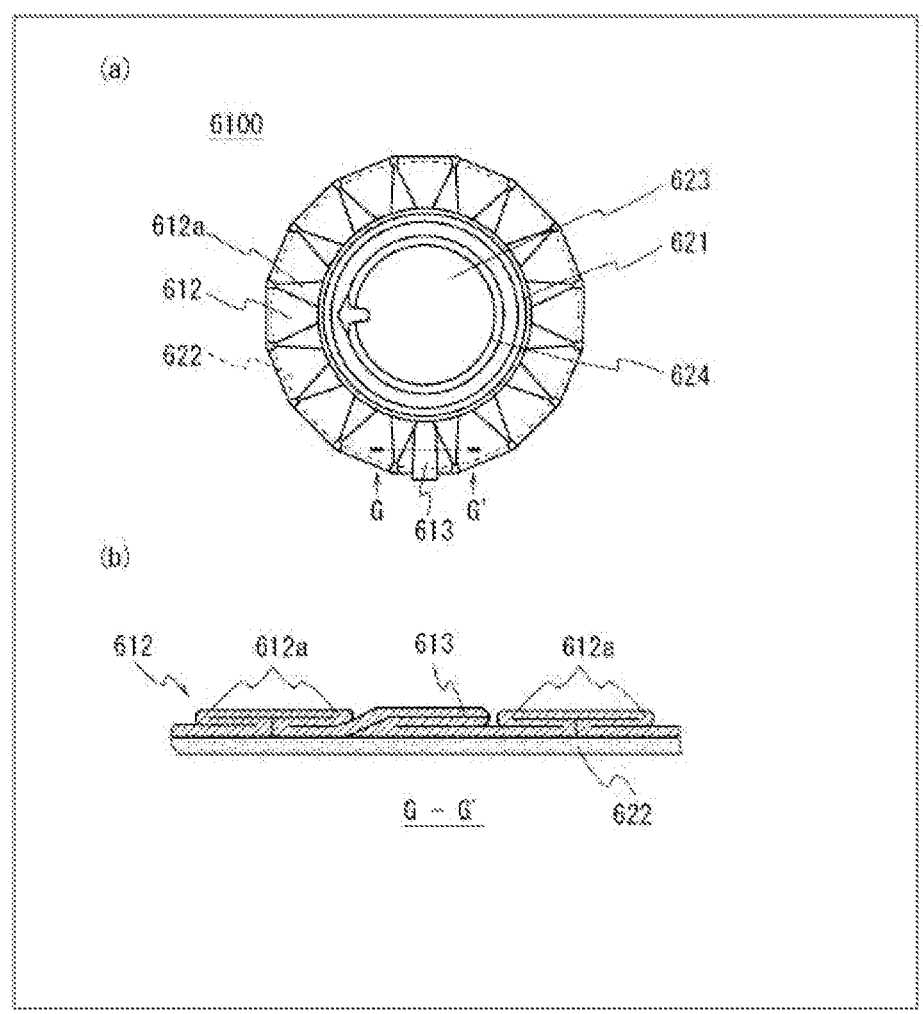
FIG. 28 shows a plan view and a cross-sectional view of a major part of the tubular container according to the sixth embodiment of the present invention.

FIG. 27 shows a front view of the tubular container 6100. FIG. 28 shows a plan view ((a) of FIG. 28) and a cross-sectional view ((b) of FIG. 28) of a major part, cut along a G-G' line.

The trunk portion 610 is a tubular member that is formed of a soft material, has the closed bottom portion 611, and is able to store contents (not shown) therein. In order to attach the spout portion 620 to the top portion 612 of the trunk portion 610 by welding, the trunk portion 610 is formed so as to contain a material that can be welded to at least an inner peripheral surface of the top portion 612.

The trunk portion 610 can be formed by using a film, for example. More specifically, after a film is shaped like a tube, parts of the film at the bottom portion 611 are adhered to each other, and parts of the film at the edges along the longitudinal direction of the trunk portion 610 are adhered to each other. The film adhering method is not particularly limited. For example, heat sealing, bonding using a tap, or the like can be adopted. When adhering the parts of the film at the edges along the longitudinal direction of the trunk portion 610, this adhesion may be performed such that the edges of an innermost layer of the film are made to face each other and adhered (butt-seam sealing), such that the innermost layer and an outermost layer of the film are made to face each other and adhered (envelope-like sealing), or such that the end parts of the film are made to abut on each other. The trunk portion 610 includes, for example, a joint portion 613 formed by making the edges of the innermost layer of the film face each other, and adhering the edges.

The spout portion 620 is a member that is attached to the top portion 612 and is able to close the top portion 612 of the trunk portion 610. The spout portion 620 includes a discharge portion 621 for discharging the contents stored in the trunk portion 610, and a peripheral portion 622 formed around the discharge portion 621. As shown in FIG. 27, the discharge portion 621 is a cylindrical member, for example. However, the shape of the discharge portion 621 is not limited as long as it can discharge the contents, and may be merely an opening. The peripheral portion 622 has a circular plate shape, for example. However, the shape of the peripheral portion 622 is not limited as long as the top portion 612 can be attached to the spout portion 620, and may be an ellipse, an elongated circle, a polygon, or any other shape. Alternatively, the peripheral portion 622 may have a tapered shape the outer diameter of which decreases with an increasing distance from the top portion 612. The material of the spout portion 620 is not particularly limited, but a material that can be welded to a weldable material on the inner peripheral surface of the trunk portion 610 is preferable. For example, a resin material such as low-density polyethylene can be used.

The spout portion 620 further includes, inside the discharge portion 621, a partition wall 623 in which an annular half cut is formed, and a pull ring 624 attached to the partition wall 623, for example. Therefore, when the user of the tubular container 6100 pulls the pull ring 624 to remove a part of the partition wall 623 along the half cut, an opening for taking out the contents is formed in the partition wall 623.

As shown in (b) of FIG. 28, in a first area that is an area over the entire circumference of a surface on the outer side of the tubular container 6100, the inner peripheral surface near the top portion 612 of the folded trunk portion 610 is welded to the peripheral portion 622 of the spout portion 620. In addition, in the tubular container 6100, for example, the top portion 612 includes a plurality of pleated parts 612a formed by folding back the top portion 612 such that opposed parts of the inner peripheral surface of the trunk portion 610 abut on each other.

The number of the pleated parts 612a is appropriately adjustable according to the shape of the peripheral portion 622, the thickness of the film forming the trunk portion 610, or the like. In the tubular container 6100, for example, 16 pleated parts 612a are provided. From the viewpoint of designability, strength of a processing machine for forming pleated parts 612a, and the like, the number of the pleated parts 612a is preferably not less than 3 and not greater than 60, and more preferably, not less than 3 and not greater than 36.

The interval of the pleated parts 612a in the peripheral portion 622 is appropriately adjustable according to the shape of the peripheral portion 622, the thickness of the film forming the trunk portion 610, or the like. When the peripheral portion 622 has a shape, such as an ellipse, the curvature radius of which varies over the circumferential direction of the trunk portion 610, the pleated parts 612a may be arranged such that, for example, the interval of the pleated parts 612a is reduced in an area where the curvature radius is small while the interval of the pleated parts 612a is increased in an area where the curvature radius is great. In the tubular container 6100, since the peripheral portion 622 has a circular shape, the pleated parts 612a are arranged at equal intervals over the circumferential direction of the trunk portion 610, for example. Since the interval of the pleated parts 612a is varied according to the curvature radius of the peripheral portion 622, the top portion 612 can be folded along the edge of the peripheral portion 622. The folded part of the top portion 612 need not completely abut on the edge of the peripheral portion 622. However, in order to increase the connection strength between the trunk portion 610 and the spout portion 620, the edge of the peripheral portion 622 is preferably inscribed in the folded part of the top portion 612, as viewed in the longitudinal direction of the trunk portion 610.

Figure 29:
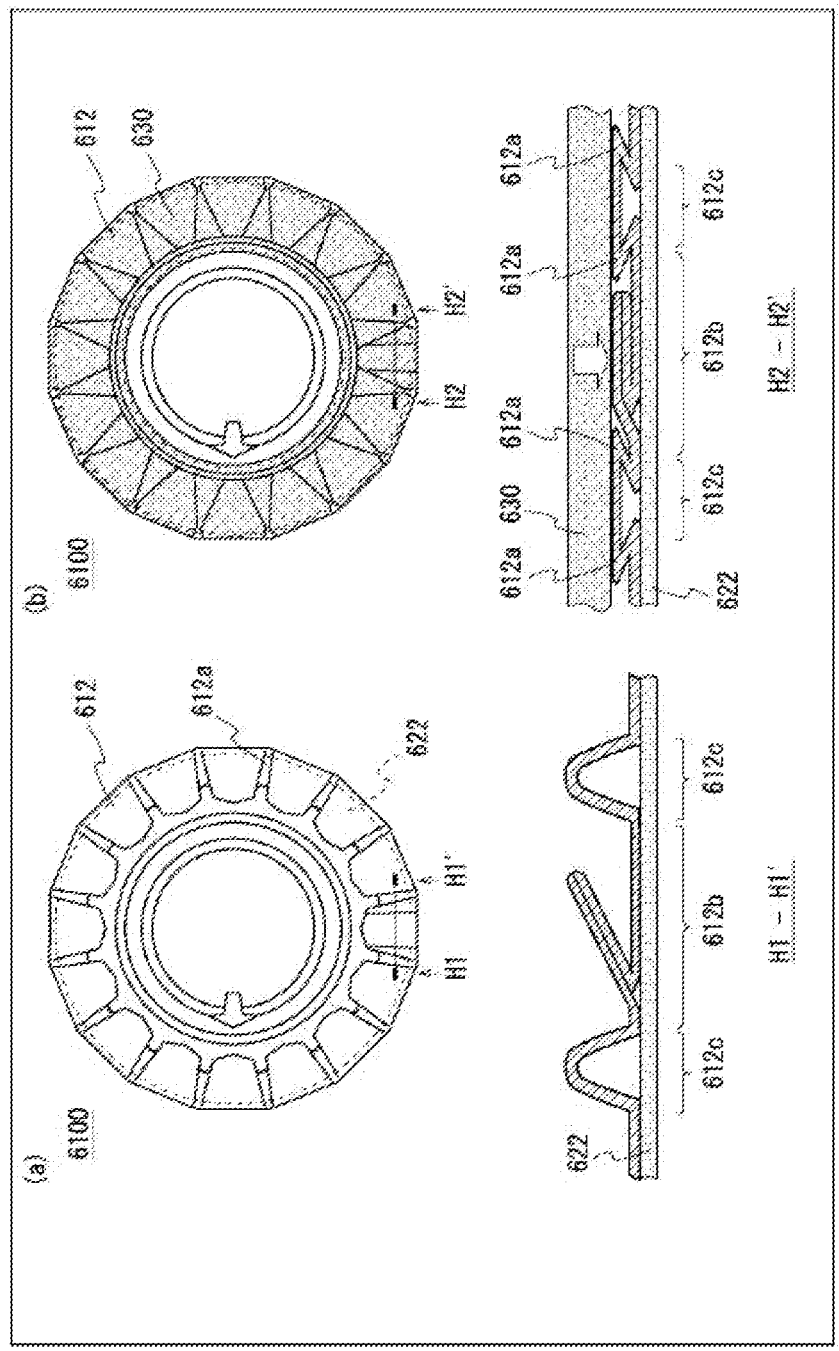
FIG. 29 shows a plan view and a cross-sectional view of a major part, illustrating a welding process for the tubular container according to the sixth embodiment of the present invention.

Next, an example of a method of welding the top portion 612 to the peripheral portion 622 will be described with reference to FIG. 29. FIG. 29 shows a plan view and a cross-sectional view of a major part, illustrating a process of welding the trunk portion 610 of the tubular container 6100 to the peripheral portion 622.

Firstly, the spout portion 620 is inserted near the top portion 612 of the trunk portion 610 in the tubular shape, the bottom portion 611 of which is not yet closed. Thereafter, the top portion 612 is folded toward an upper side of the peripheral portion 622 by using a processing machine having claws corresponding to the number of the pleated parts 612a. In FIG. 29, (a) shows a plan view of the tubular container 6100 and a cross-sectional view of the top portion 612 and its vicinity, in the state where the top portion 612 is folded toward the upper side of the peripheral portion 622.

As shown in (a) of FIG. 29, the folded top portion 612 includes alternating contact parts 612b and non-contact parts 612c over the circumferential direction of the trunk portion 610. Each contact part 612b is in contact with the peripheral portion 622 while each non-contact part 612c is not in contact with the peripheral portion 622 and protrudes outward from the tubular container 6100. In the tubular container 6100, the top portion 612 is folded such that the width of the contact part 612b in the circumferential direction of the trunk portion 610 is wider than the width of the non-contact part 612c in the circumferential direction.

Next, the entirety of the top portion 612 is heated and pressed by a ring-shaped thermocompression means 630 from above. In FIG. 29, (b) shows a plan view of the tubular container 6100 and a cross-sectional view of the top portion 612 and its vicinity, in the state where the top portion 612 is heated and pressed by the thermocompression means 630. Thus, the contact parts 612b are welded to the peripheral portion 622. Meanwhile, when the non-contact parts 612c are pressed by the thermocompression means 630, at least a part of each non-contact part 612c is folded back such that opposed parts of the inner peripheral surface of the trunk portion 610 abut on each other, resulting in two pleated parts 612a in which opposed parts of the inner peripheral surface are welded to each other. A part of the non-contact part 612c in which opposed parts of the inner peripheral surface of the trunk portion 610 do not abut on each other (i.e., a part that is not formed into a pleated part 612a) may be welded to the peripheral portion 622. As a specific welding method using the thermocompression means 630, hot-plate pressing, ultrasonic sealing, high-frequency sealing, impulse sealing, or the like can be adopted.

First Modification

Figure 30:
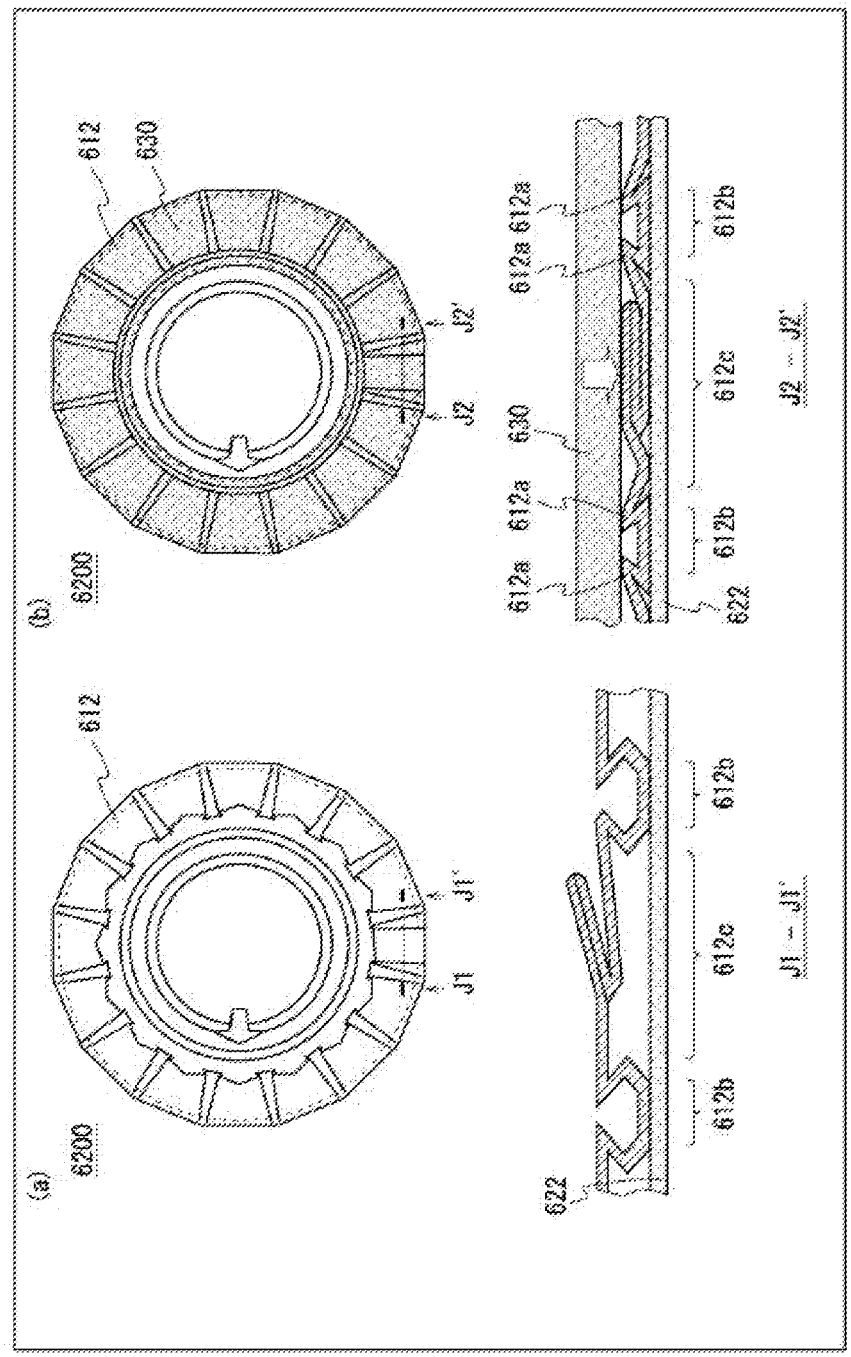
FIG. 30 shows a plan view and a cross-sectional view of a major part, illustrating a welding process for a tubular container according to a first modification of the sixth embodiment of the present invention.

The configuration of the top portion 612 when being adhered to the peripheral portion 622 is not limited to the above configuration as long as the top portion 612 includes the contact parts 612b and the non-contact parts 612c. For example, the top portion 612 may be folded such that the width of each non-contact part 612c in the circumferential direction of the trunk portion 610 is wider than the width of each contact part 612b in the circumferential direction. FIG. 30 shows plan views and cross-sectional views of a major part, illustrating a process of welding the trunk portion 610 to the peripheral portion 622 in a tubular container 6200 according to a modification in which the width of each non-contact part 612c in the circumferential direction of the trunk portion 610 is wider than the width of each contact part 612b in the circumferential direction. In FIG. 30, (a) shows a state where the top portion 612 is folded toward an upper side of the peripheral portion 622, and (b) shows a state where the top portion 612 is heated and pressed by the thermocompression means 630.

As shown in (b) of FIG. 30, in the tubular container 6200, each contact part 612b is welded to the peripheral portion 622 by the thermocompression means 630, as in the tubular container 6100. Meanwhile, each non-contact part 612c is at least partially formed into two pleated parts 612a, and a part that is not formed in a pleated part 612a can be adhered to the peripheral portion 622.

As described above, in the tubular containers 6100 and 6200, the trunk portion 610 and the spout portion 620 are attached to each other by welding, to the peripheral portion 622, the inner peripheral surface near the top portion 612, of the trunk portion 610, which is folded in the first area. Therefore, welding can be performed in a wider area as compared to the conventional art, and highly accurate alignment is not required for the welding of the trunk portion 610 to the spout portion 620, thereby facilitating the production.

Moreover, in the tubular containers 6100 and 6200, since heat shrinkage is not required during the welding of the trunk portion 610 and the spout portion 620, a material such as aluminum foil that hardly shrinks by heat can be used, thereby increasing the range of material choice, and increasing the degree of freedom in design.

Moreover, since the inner peripheral surface near the top portion 612, of the trunk portion 610, which is folded in the first area is welded to the peripheral portion 622, an angle formed between the peripheral portion 622 and the trunk portion 610 can be set to be greater than in the case where welding is performed on a round-chamfered portion by using heat shrinkage. Therefore, the amount of contents remaining inside the spout portion 620 can be reduced as compared to a spout portion having a tapered shape. Moreover, since the spout portion 620 does not have a tapered shape, the contents can be easily pushed out by squeezing the trunk portion 610 until closely contacting with the discharge portion 621 of the spout portion 620.

The spout portion 620 in which the surface of the peripheral portion 622 is flat has been described above. However, for example, projections each corresponding to the shape of a pleated part 612a may be formed in advance in a place where pleated parts 612a are to be provided. In this case, contact parts 612b and non-contact parts 612c can be formed along the projections, thereby facilitating folding of the top portion 612.

Furthermore, cutouts corresponding to pleated parts 612a may be formed in advance in a portion to be the top portion 612. Thus, formation of pleated parts 612a through heating and compression is facilitated.

Second Modification

Figure 31:
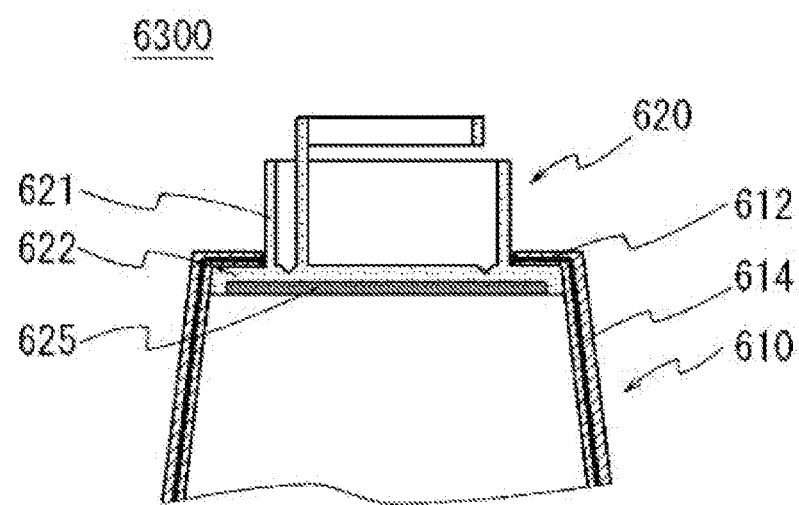
FIG. 31 is a cross-sectional view of a major part of a tubular container according to a second modification of the sixth embodiment of the present invention.

FIG. 31 shows a cross-sectional view of a major part of a tubular container 6300 according to a modification of the sixth embodiment. A difference between the tubular container 6300 and the tubular container 6100 is presence/absence of a gas barrier layer 614 provided in the trunk portion 610 and a barrier film 625 provided in the spout portion 620.

As shown in FIG. 31, the spout portion 620 of the tubular container 6300 includes a second area in which the barrier film 625 is provided on a surface facing the inside of the tubular container 6300. A film forming the trunk portion 610 includes the gas barrier layer 614. The trunk portion 610 is adhered and attached to the spout portion 620 such that the first area and the second area overlap each other, as viewed from a normal direction in the third area over the entire circumference of the peripheral portion 622 of the spout portion 620.

Therefore, in the tubular container 6300 the trunk portion 610 of which is attached to the spout portion 620, an area having no gas barrier property is absent as viewed from the normal direction at each position in the peripheral portion 622, thereby realizing high gas barrier property.

The trunk portion 610 used in any of the tubular containers 6100 to 6300 according to the sixth embodiment may be attached to the spout portion of the tubular container according to any of the first to fourth embodiments.

Seventh Embodiment

According to the present embodiment, it is possible to provide a tubular container that can inhibit the contents from remaining inside the container.

Figure 32:
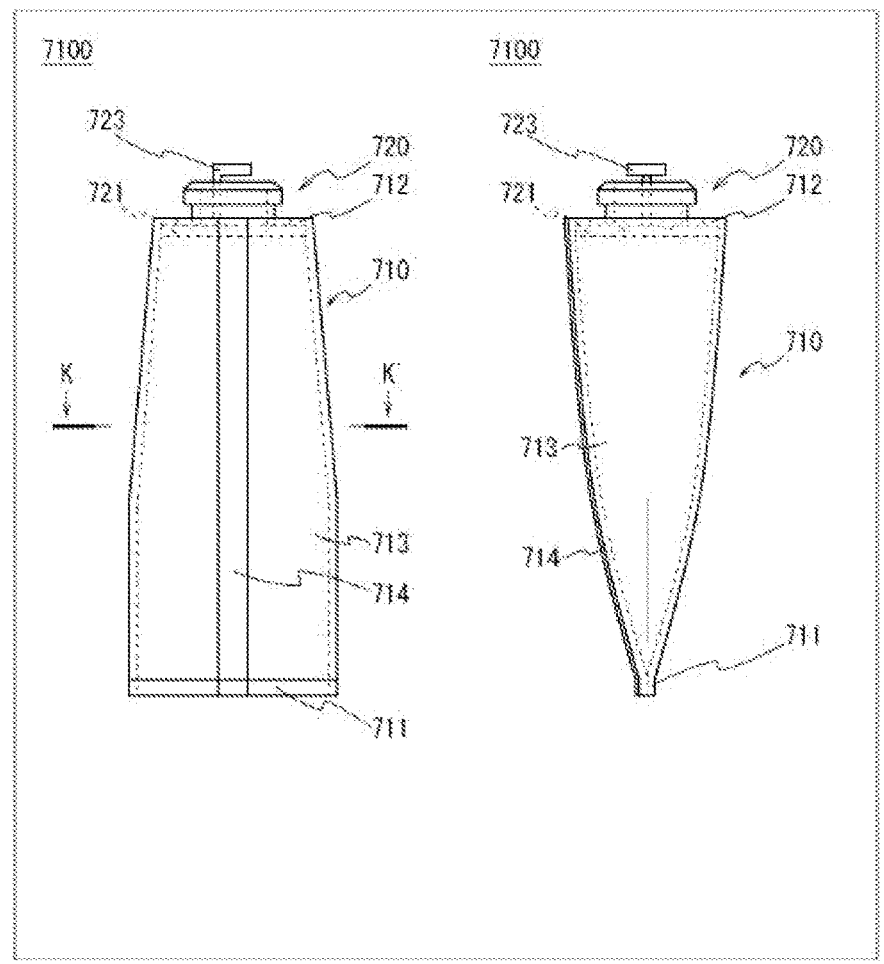
FIG. 32 shows a front view and a side view of a tubular container according to a seventh embodiment of the present invention.
Figure 33:
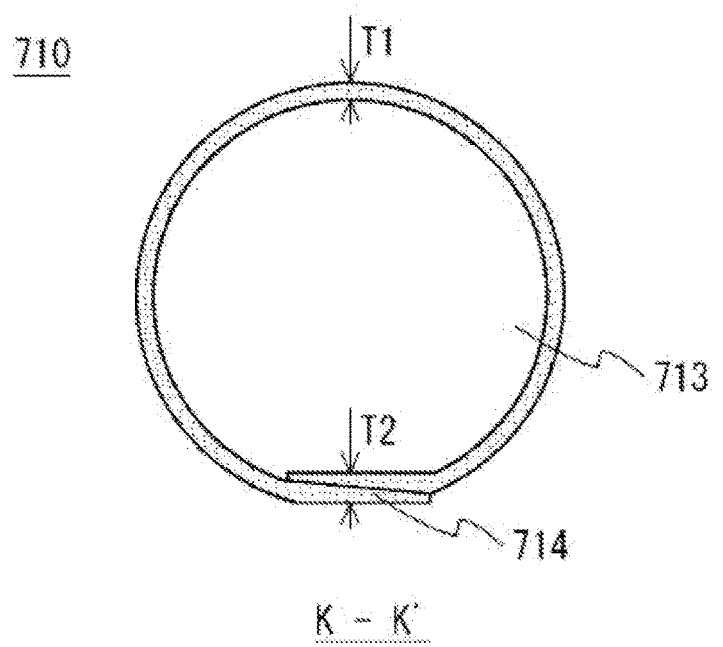
FIG. 33 is a cross-sectional view of a trunk portion of the tubular container according to the seventh embodiment of the present invention.
Figure 34:
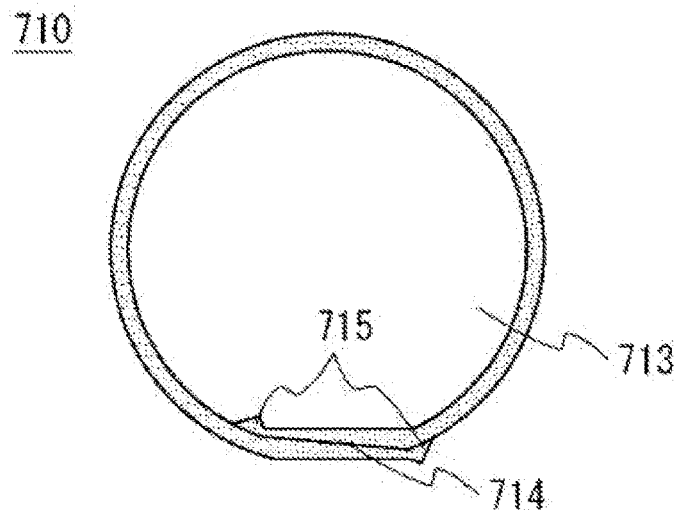
FIG. 34 is a cross-sectional view of the trunk portion of the tubular container according to the seventh embodiment of the present invention.

A tubular container 7100 according to a seventh embodiment of the present invention includes a trunk portion 710 one end of which is closed, and a spout portion 720 attached to the other end of the trunk portion 710. FIG. 32 shows a front view and a side view of the tubular container 7100. FIG. 33 and FIG. 34 each are a cross-sectional view of the trunk portion 710 cut along a K-K' line.

The trunk portion 710 is a tubular member having a closed bottom portion 711 at one end thereof, and includes a storage portion 713 in which contents can be stored. The trunk portion 710 is formed by using a film. A thinnest part of the film surrounding the storage portion 713 has a thickness T1 not smaller than 40 μm and not greater than 200 μm, and a thickest part of the film has a thickness T2 not greater than twice the thickness T1.

The trunk portion 710 has, for example, a joint portion 714 formed by joining the edges of the film to each other. As shown in FIG. 33, the joint portion 714 is formed by making an inner layer and an outer layer face each other at the edges of the film, and joining these layers. The joint portion 714 is formed extending along the longitudinal direction of the trunk portion 710. In the trunk portion 710, the thickness T1 is the thickness of the film, and the thickness T2 is the thickness of the joint portion 714.

The joint portion 714 can be formed by, for example, providing a sealant layer containing polyethylene on a front surface and a rear surface of the film, and heat-sealing these sealant layers. After the heat sealing, the joint portion 714 may be pressed while being further heated. Thus, the fused sealant layers overflow from the end faces of the film and form a protection layer 715 at the end faces of the film. When the film is a lamination film, the protection layer 715 inhibits delamination of the lamination film from the end faces. FIG. 34 is a cross-sectional view of the trunk portion 710 having the protection layer 715.

The layer configuration of the film used for forming the trunk portion 710 may be a single-layer film, or a multi-layer film molded by lamination or extrusion The film can be formed by using, but not particularly limited to, a resin material such as polyethylene terephthalate (PET), nylon (NY), or straight-chain (linear) low-density polyethylene (LLDPE), for example. The film member may include a known functional film according to a function required of the trunk portion 710. For example, in order to impart gas barrier property to the trunk portion 710, a film containing aluminum foil, EVOH resin, or the like may be laminated.

The spout portion 720 is a member that is attached to the top portion 712 located on the other end of the trunk portion 710 and is able to close the top portion 712 of the trunk portion 710. Since the spout portion 720 is identical to the spout portion 120 used in the tubular container 1100, repeated description is not necessary.

As shown in FIG. 32, at an edge of a closing portion 721, a top portion 712 of the trunk portion 710 is bent along the surface, of the closing portion 721, on the side opposite to the bottom portion 711 of the trunk portion 710, and is adhered to the closing portion 721. For example, when the trunk portion 710 is formed of a film having a sealant layer containing polyethylene as an innermost layer while the spout portion 720 is formed of a material containing polyethylene, the trunk portion 710 and the closing portion 721 can be adhered to each other by heat sealing.

Since the thickness T1 is not smaller than 40 μm and not greater than 200 μm, a constant strength of the trunk portion 710 is ensured, and rigidity of the trunk portion 710 is inhibited from becoming excessively high. In addition, since the thickness T2 is not greater than twice the thickness T1, the joint portion 714 is inhibited from being thicker than the rest of the trunk portion 710, thereby inhibiting uneven thickness of the top portion 712. Thus, the top portion 712 can be easily bent along the surface, of the closing portion 721, on the side opposite to the bottom portion 711, and moreover, joint failure, i.e., partial delamination at the joint portion between the top portion 712 and the closing portion 721 due to uneven thickness, can be inhibited. Moreover, degradation of designability caused by the joint portion 714 swelling on the closing portion 721, can be inhibited.

First Modification

Figure 35:
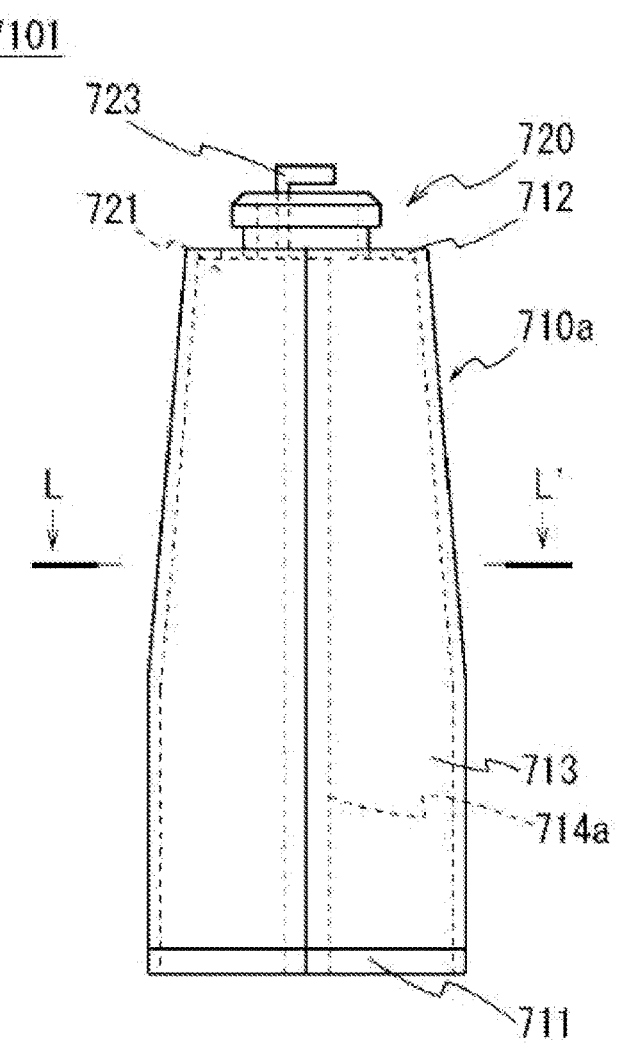
FIG. 35 shows a front view and a side view of a tubular container according to a first modification of the seventh embodiment of the present invention.
Figure 36:
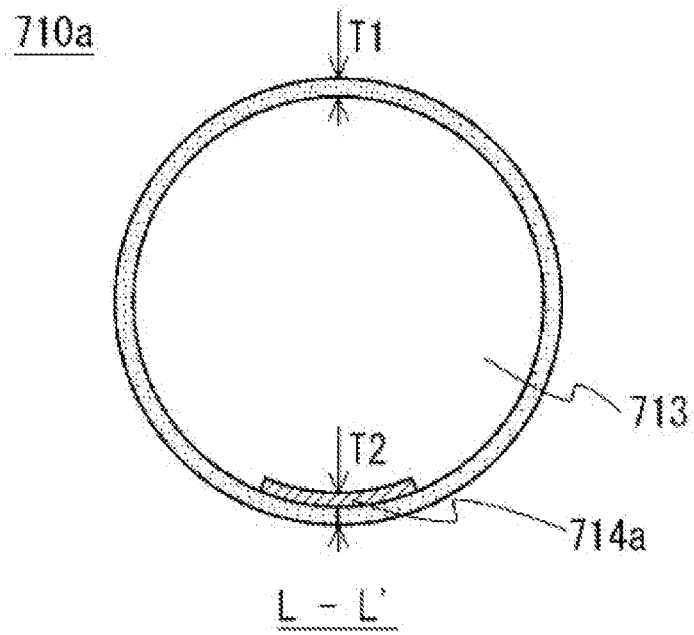
FIG. 36 is a cross-sectional view of a trunk portion of the tubular container according to the first modification of the seventh embodiment of the present invention.

Next, a tubular container 7101 according to a first modification of the seventh embodiment will be described. The tubular container 7101 includes a trunk portion 710a one end of which is closed, and a spout portion 720 attached to the other end of the trunk portion 710a. FIG. 35 shows a front view of the tubular container 7101, and FIG. 36 is a cross-sectional view of the trunk portion 710a cut along an L-L' line.

The tubular container 7101 is different from the tubular container 7100 in the method of joining the edges of a film forming the trunk portion 710a. Specifically, as shown in FIG. 36, the edges of the film of the trunk portion 710a are covered with a tape member 714a while the end faces thereof abut on each other. In the trunk portion 710a, the tape member 714a covers the edges of the film from the inner side of the trunk portion 710a, and extends along the longitudinal direction of the trunk portion 710a. In the trunk portion 710a, a thickness T1 is the thickness of the film, and a thickness T2 is the thickness in an area where the tape member 714a covers the film, i.e., the total thickness of the film and the tape member 714a.

The material of the tape member 714a may be the same as or different from the material of the film. The tape member 714a may be formed by using a lamination film including a functional film such as a gas barrier film according to a required function.

The thickness of the tape member 714a is preferably small in order to inhibit the thickness T2 from increasing. However, as long as the thicknesses T1 and T2 are in the aforementioned ranges, the thickness of the tape member 714a may be greater than the thickness of the film. The tape member 714a can be formed by using, but not particularly limited to, a resin material such as polyethylene or polyethylene terephthalate.

Figure 37:
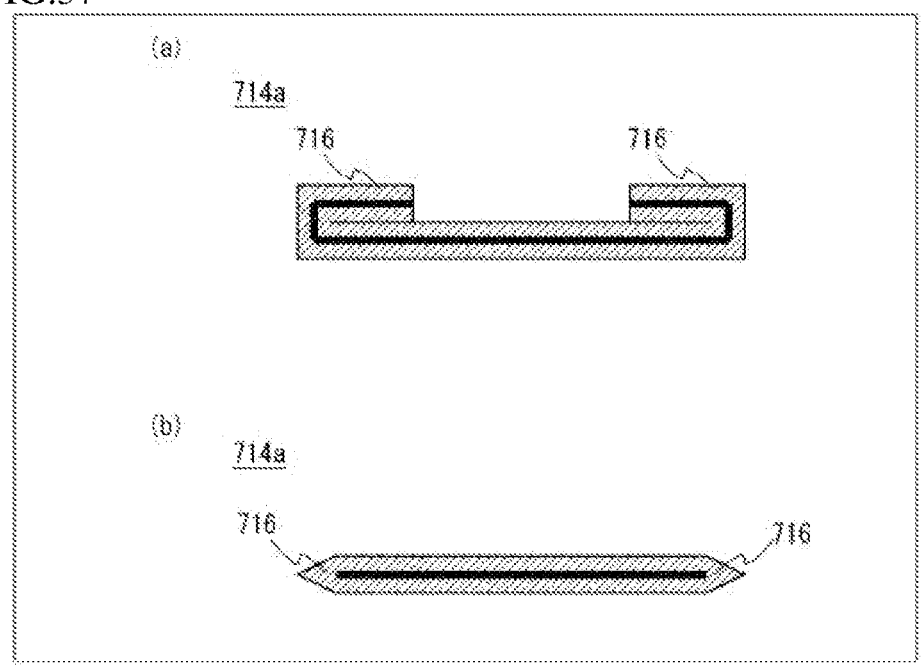
FIG. 37 is a cross-sectional view of a tape member of the tubular container according to the first modification of the seventh embodiment of the present invention.

The tape member 714a may have an end part protective shape 716 that covers and protects an end part. In FIG. 37, (a) and (b) each show a cross-sectional view of the tape member 714a cut along a plane orthogonal to the length direction thereof. The tape member 714a shown in (a) of FIG. 37 has, for example, an end part protective shape 716 obtained by folding back an end part. Meanwhile, the tape member 714a shown in (b) of FIG. 37 has, for example, an end part protective shape 716 covering an end part with a sealant. Since the end part of each tape member 714a is covered with the end part protective shape 716, delamination of a laminated film from the edge can be inhibited when the film is a lamination film. The tape member 714a may cover the edges of the film from the outer side of the trunk portion 710a, or from both the outer side and the inner side of the trunk portion 710a.

The tubular container 7101 also can inhibit the contents from remaining inside thereof. Moreover, since the thickness T1 of the trunk portion 710a is not smaller than 40 μm and not greater than 200 μm and the thickness T2 is not greater than twice the thickness T1, occurrence of joint failure and degradation of designability are inhibited.

Second Modification

Figure 38:
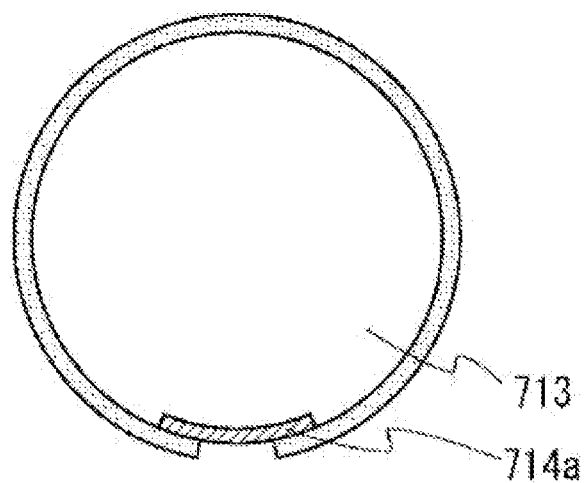
FIG. 38 is a cross-sectional view of the trunk portion of the tubular container according to the first modification of the seventh embodiment of the present invention.

As long as the thicknesses T1 and T2 are within the aforementioned ranges, the film of the trunk portion 710a may have a predetermined gap between the end parts thereof. FIG. 38 is a cross-sectional view of the trunk portion 710a according to a second modification. The trunk portion 710a according to the second modification has a gap between the end parts. Therefore, for example, if the tape member 714a has air permeability, the internal pressure of the trunk portion 710a can be inhibited from increasing to a predetermined pressure or more. Moreover, if the tape member 714a is a transparent film, the amount of contents in the trunk portion 710a can be visually recognized through the tape member 714a.

Third Modification

Figure 39:
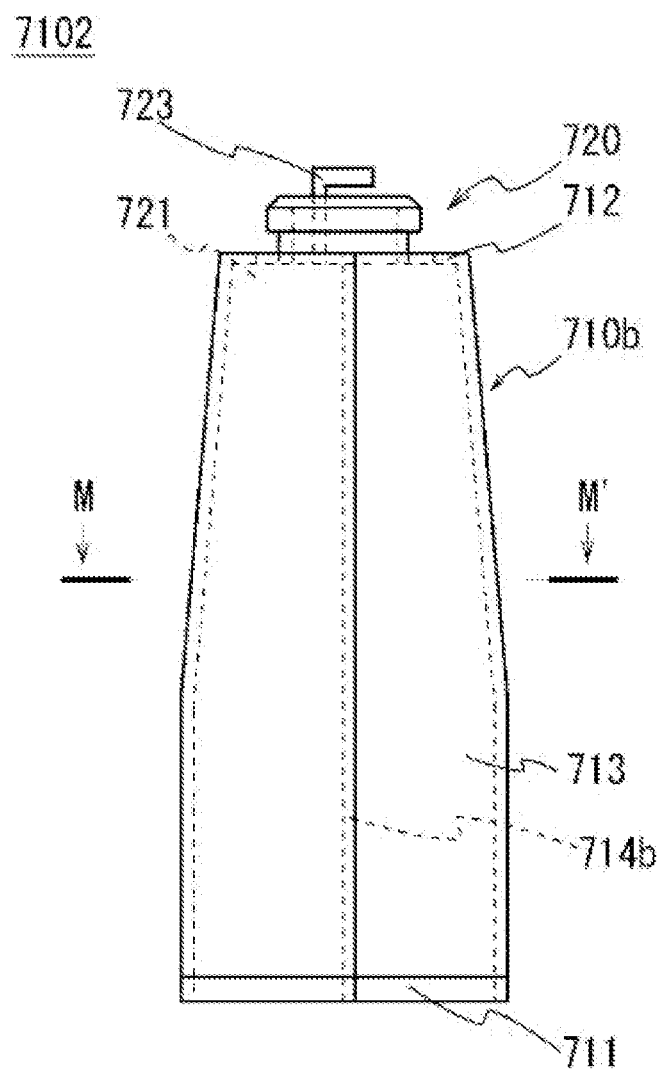
FIG. 39 shows a front view and a side view of a tubular container according to a second modification of the seventh embodiment of the present invention.
Figure 40:
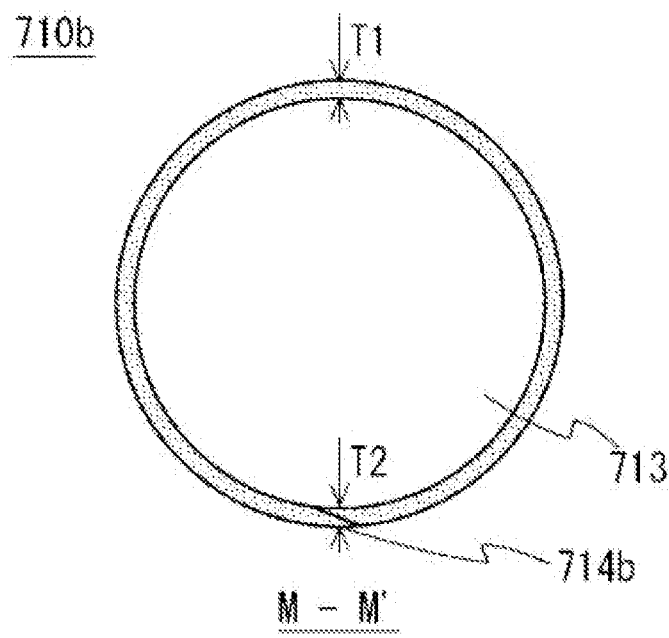
FIG. 40 is a cross-sectional view of a trunk portion of the tubular container according to the second modification of the seventh embodiment of the present invention.
Figure 41:
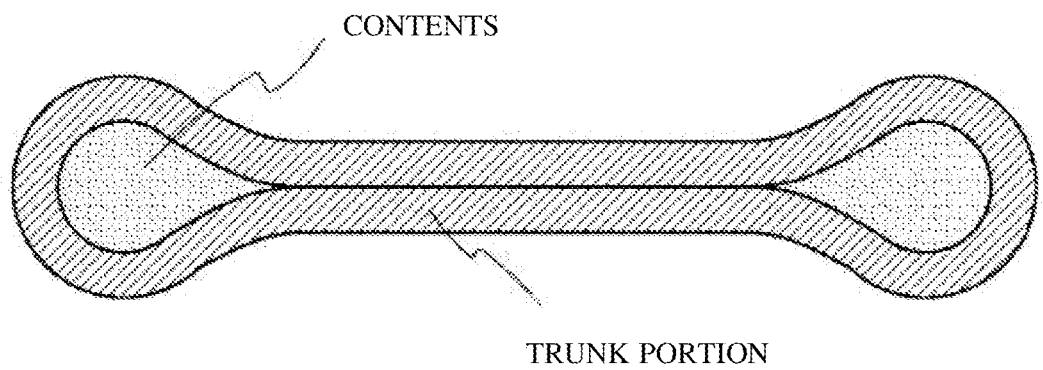
FIG. 41 is a cross-sectional view of a tubular container according to the conventional art.

Next, a tubular container 7102 according to a third modification of the seventh embodiment will be described. The tubular container 7102 includes a trunk portion 710b one end of which is closed, and a spout portion 720 attached to the other end of the trunk portion 710b. FIG. 39 shows a front view of the tubular container 7101. FIG. 40 is a cross-sectional view of the trunk portion 710b cut along an M-M' line.

The tubular container 7102 is different from the tubular container 7100 in the method of joining the edges of a film forming the trunk portion 710b. Specifically, as shown in FIG. 40, the edges of the film of the trunk portion 710b are joined to each other such that the end parts of the film are sloped with respect to the film in its flat state, and the sloped end parts are opposed to each other and joined so that the thickness of the trunk portion 710b in the circumferential direction is substantially constant. A joint portion 714b formed by joining the end parts extends along the longitudinal direction of the trunk portion 710b. The end parts of the joint portion 714b can be joined by welding or adhesion. In the trunk portion 710, a thickness T1 is the thickness of the film, and a thickness T2 is the thickness of the Joint portion 714. Since the trunk portion 710b has the substantially constant thickness in the circumferential direction as described above, the thickness T1 is substantially equal to the thickness T2 as shown in FIG. 40.

The tubular container 7102 also can inhibit the contents from remaining inside thereof. Moreover, since the thickness T1 of the trunk portion 710b is not smaller than 40 μm and not greater than 200 μm and the thickness T2 is not greater than twice the thickness T1, occurrence of joint failure and degradation of designability are inhibited.

The method of forming the trunk portion 710 is not limited to the aforementioned methods, and any method, such as fusing, extrusion molding, or blow molding, may be adopted as long as the method ensures the thicknesses T1 and T2 of the trunk portion 710 to be within the aforementioned ranges.

The film member used for the trunk portion in any of the embodiments described above and the modifications thereof may have a loop stiffness value not greater than 600 mN for a loop length of 60 mm in the width direction of the trunk portion.

The loop stiffness value is as follows. That is, a loop is formed by using a film member that is cut into a strip shape of a predetermined size, the loop is pressed by a predetermined amount in the diameter direction, and then the repelling force of the loop is measured. The loop stiffness value is the measured repelling force, and is an index indicating the rigidity of the film. The larger the loop stiffness value is, the higher the rigidity of the film is. The loop stiffness value was measured by using a loop stiffness tester manufactured by Toyo Seiki Co., Ltd., according to the procedure and condition as follows. Firstly, the film member used for the trunk portion was cut into a strip shape having a width of 25 mm and a length of 120 mm. Then, the strip-shaped film was set on the tester such that the longitudinal direction thereof corresponds to the direction of the measurement target, and a loop was formed. At this time, the loop length was 60 mm. Thereafter, a contact plate of the tester was pressed against the formed loop to squeeze the loop, and the repelling force of the loop was measured. The squeezing distance was 20 mm, and the compression rate was 3.5 mm/s.

The rigidity of the formed trunk portion can be reduced by using a material having a small loop stiffness value and a low elasticity as the film member. Therefore, after the trunk portion formed by using the film member having a loop stiffness value not greater than 600 mN is deformed and the contents are squeezed out, restoration of the trunk portion to the original shape can be avoided. Thus, occurrence of air back, i.e., inflow of air into the trunk portion, can be inhibited. As a result, deterioration of quality of the contents due to the inflow air can be inhibited, and the contents can be squeezed out without turning the spout portion upside down, whereby occurrence of abrupt spouting of the contents can be inhibited.

Since the material of the film member contains a resin, the film member can be deformed with a smaller force as compared to the trunk portion formed of a layer mainly composed of a material having high dead hold property. Therefore, even when the contents have high viscosity, the contents can be easily squeezed out. Moreover, generation of minute holes in the film member due to repetitive use can also be inhibited.

Since the loop stiffness value of the film member is reduced to 600 mN or less, the film member can be formed of less material, and the layer configuration of the film member is simplified, thereby reducing the production cost.

Since the elasticity of the film member is low, the trunk portion can be produced by using a bag making machine capable of making bag-shaped packaging containers without using a relatively expensive tubing machine, thereby reducing the production cost.

In this case, the spout portion may be provided with a valve that allows outflow of the contents from the trunk portion, and regulates inflow of air into the trunk portion while the contents do not flow out. Thus, since the loop stiffness value of the trunk portion is not greater than 600 mN, the trunk portion is prevented from being restored to the original shape, and moreover, the valve being closed regulates inflow of air into the trunk portion more reliably, whereby occurrence of air back can be inhibited more reliably. In particular, even when a valve of a simple structure, the backflow checking effect of which is limited, is used, occurrence of air back can be effectively inhibited in the entire tubular container. Therefore, the production cost of the tubular container can be reduced.

The thickness of the film member can be not smaller than 30 μm and not greater than 200 μm, and the loop stiffness value can be not greater than 600 mN for the loop length of 60 mm in the width direction of the trunk portion. Thus, when the contents are squeezed out, the trunk portion can be evenly pressed and squeezed up to the end part thereof to reduce the curvature radius at the end part in the width direction of the trunk portion, thereby inhibiting remaining of the contents. Also in this case, the loop stiffness value is measured according to the aforementioned procedure and condition.

The thickness of the film member can be not smaller than 30 μm and not greater than 200 μm, and the trunk portion may have ruled lines extending in the length direction of the trunk portion, between the other end of the trunk portion and at least one of both ends of the bottom portion 11 in the width direction. Thus, when the contents are squeezed out, the film member can be bent along the ruled lines. This prevents gaps which cannot be squeezed flat from being formed at the end parts in the width direction of the trunk portion, thereby inhibiting remaining of the contents in such gaps. The ruled lines can be formed by, for example, heating and pressing the trunk portion at a temperature not higher than the fusing point of the material forming the film member.

In the tubular container according to any of the aforementioned embodiments and the modifications thereof, the components such as the spout portion, the trunk portion, and the cap may be formed of a mono-material in order to facilitate recycling. Examples of a usable material include, but not particularly limited to, PP including biaxially stretched polypropylene (OPP) and unstretched polypropylene (CPP). Examples of a layer configuration of a film member used for forming the trunk portion include: OPP (20 μm) with gas barrier property/CPP (80 μm); OPP (20 μm)/OPP (20 μm) with gas barrier property/CPP (80 μm); and OPP (30 μm)/CPP (80 μm). The thickness of each layer can be changed as appropriate according to the capacity of the trunk portion. Moreover, for production of the spout portion, a single PP or a PP blended with a resin having gas barrier property can be used.

As for an example using other materials, there is a film member having gas barrier property and including: a gas barrier lamination that includes a base layer, a first polyvinyl alcohol resin layer, a thin film layer containing Si or Al, and a second polyvinyl alcohol resin layer in this order; and a sealant layer provided on the surface of this gas barrier lamination.

In this case, the second polyvinyl alcohol resin layer may contain a silane compound. The mass ratio of the silane compound may be 0.005 to 0.80 from the viewpoint of maintaining the gas barrier property and the adhesiveness with the thin film layer containing Si or Al.

The thin film layer containing Si or Al may contain at least one of silicon oxide and aluminum oxide. The thin film layer containing Si or Al may contain silicon oxide and aluminum oxide from the viewpoint of transparency and barrier property, and may contain silicon oxide from the viewpoint of improving tensile stretch property during machining. Use of the thin film layer containing Si or Al achieves high barrier property while reducing the thickness.

The thickness of the thin film layer containing Si or Al can be not smaller than 5 nm and not greater than 80 nm. When the thickness is 5 nm or more, sufficient gas barrier property can be achieved. When the thickness is 80 nm or less, cracks are inhibited from being caused by deformation due to the internal stress of the thin film layer, thereby inhibiting reduction in the gas barrier property. If the thickness exceeds 80 nm, the cost is likely to increase due to an increase in the use amount of materials, an increase in time required for film formation, or the like, which is undesirable from an economical viewpoint.

The mass of the first polyvinyl alcohol resin layer per unit area can be not smaller than 0.1 g/m$^2$ and not greater than 10 g/m$^2$. When the mass is 0.1 g/m$^2$ or more, the surface of the first polyvinyl alcohol resin layer can be formed sufficiently flat even when the flatness of the surface of the base layer is insufficient, whereby a thin film layer containing Si or Al having excellent gas barrier property can be formed on the surface of the first polyvinyl alcohol resin layer. Meanwhile, the mass being 10 g/m$^2$ or less is advantageous from the viewpoint of realizing a mono-material tubular container and reducing the material cost.

The roughness Sa of the first polyvinyl alcohol resin layer on the side in contact with the thin film layer containing Si or Al may be 0.2 μm or less. Thus, a thin film layer containing Si or Al, excellent in gas barrier property, can be formed on the surface of the first polyvinyl alcohol resin layer. The roughness Sa means a value measured by using VertScan (manufactured by Ryoka Systems Inc.).

From the viewpoint of achieving excellent oxygen barrier property, the surface of the first polyvinyl alcohol resin layer on the side in contact with the thin film layer containing Si or Al may have a logarithmic decrement not greater than 0.20 at 100° C. and a logarithmic decrement not greater than 0.30 at 125° C., which are measured by using a rigid body pendulum-type physical property tester. The logarithmic decrements can be measured by a rigid body pendulum method (rigid body pendulum-type physical property tester RPT-3000W manufactured by A&D Company, Limited). Measurement is performed using RBP-020 as a pipe edge, under heating from 30° C. to 130° C. with a temperature rise rate of 10° C./min. Measurement is performed at three positions under this condition, and an average value of logarithmic decrements at each of 100° C. and 125° C. is calculated. The smaller logarithmic decrement means that molecules of the resin forming the surface of the measurement target are less likely to move even when subjected to heat.

The base layer may contain at least one selected from the group consisting of polyolefin, polyester, and polyamide.

The base layer of the gas barrier laminate may be formed of a polyolefin resin, the sealant layer may be formed of a polyolefin resin, and the content of the polyolefin resin may be 90% by mass or more with respect to the total mass of the trunk portion. This realizes a mono-material trunk portion.

The base layer may be a propylene monopolymer layer. Use of a propylene monopolymer film (monopolymer layer) as the base layer is advantageous in heat resistance, but is disadvantageous because the surface of the propylene monopolymer film is likely to be veined. Therefore, even when the thin film layer containing Si or Al is directly formed on the surface of the propylene monopolymer film, sufficient barrier property cannot be achieved. Therefore, a polyvinyl alcohol resin layer is interposed between the propylene monopolymer film and the thin film layer containing Si or Al to achieve excellent gas barrier property. Using both the propylene monopolymer film as the base layer and the polypropylene resin film as the sealant layer enables production of a mono-material trunk portion.

The present invention is applicable to packaging containers that can be filled with pharmaceutical products, cosmetic products, foods, etc.

What is claimed is:

1. A tubular container comprising:
    a trunk portion having a tubular shape one end of which is closed, the trunk portion being formed by using a film member containing a resin material, and being capable of storing contents therein; and
    a spout portion attached to the other end of the trunk portion, and capable of closing the other end of the trunk portion, wherein
    on a peripheral portion of the spout portion, the other end of the trunk portion is attached to a surface, of the spout portion, on a side opposite to the one end of the trunk portion, the film member has a loop stiffness value (loop length: 60 mm) not greater than 600 mN, in a width direction of the trunk portion, and
    the film member has a thickness not smaller than 30 μm and not greater than 200 μm.

2. The tubular container according to claim 1, wherein
    the spout portion includes a closing portion having a plate shape orthogonal to a longitudinal direction of the trunk portion,
    the peripheral portion is an edge of the closing portion, and
    on the peripheral portion of the closing portion, the other end of the trunk portion is adhered to a surface, of the closing portion, on the side opposite to the one end of the trunk portion.

3. The tubular container according to claim 2, wherein the closing portion of the spout portion includes a first half cut, and a first pull ring provided inside the first half cut.

4. The tubular container according to claim 3, wherein the spout portion further includes a first hinge cap attached to the spout portion, and a hole for spouting, formed in the first hinge cap, has an inner circumferential diameter greater than a diameter of the first half cut and an outer diameter of the first pull ring.

5. The tubular container according to claim 1, wherein the spout portion includes:
    a to-be-opened portion;

a first area in which an inner peripheral surface of the trunk portion is adhered to a surface, on an outer side of the tubular container, of the peripheral portion that is an edge of the to-be-opened portion, over an entire circumference of the surface;

a second area in which a gas barrier film is provided on a surface on an inner side of the tubular container; and an annular second half cut formed between the to-be-opened portion and the peripheral portion, the film member includes a gas barrier layer, and in a third area over an entire circumference of the peripheral portion of the spout portion, the trunk portion is adhered and attached to the spout portion such that the first area and the second area overlap each other, as viewed from a normal direction in the third area.

6. The tubular container according to claim 5, wherein the spout portion includes a second pick-up portion extending from an inner side of the second half cut, and the to-be-opened portion of the spout portion is removed along the second half cut by pulling the second pick-up portion with a predetermined force, thereby forming an opening in the spout portion.

7. The tubular container according to claim 5, wherein an edge of the gas barrier film is covered with the spout portion.

8. The tubular container according to claim 5, wherein the second pick-up portion is a pull ring having an annular part on a side opposite to the spout portion, and the annular part allows a finger to be inserted therein.

9. The tubular container according to claim 1, further comprising a cap to be attached to the spout portion, wherein the spout portion includes:

a third half cut formed in an annular shape;

a third pick-up portion extending from an inner side of the third half cut; and a peripheral wall having a tubular shape, disposed on an outer side of the third half cut, and extending toward a side opposite to the trunk portion, the cap includes an inner ring that is closely fitted to an inner peripheral surface of the peripheral wall in a state where the cap is attached to the spout portion, and a part of the spout portion is removed along the third half cut by pulling the third pick-up portion with a predetermined force, thereby forming an opening in the spout portion.

10. The tubular container according to claim 9, wherein the cap is a hinge cap including a fixing portion attachable to the spout portion, and a lid that is pivotally attached to the fixing portion via a hinge, and the inner ring is provided in the fixing portion.

11. The tubular container according to claim 9, wherein the cap is a screw cap that is attachable to the peripheral wall in a thread-fitted manner.

12. The tubular container according to claim 10, wherein the cap includes a contact ring that is in contact with an edge, of the peripheral wall, on the side opposite to the trunk portion, in a state where the cap is attached to the spout portion.

13. The tubular container according to claim 9, wherein the third pick-up portion is a pull ring having a ring part on a side opposite to the spout portion, and the ring part allows a finger to be inserted therein.

14. The tubular container according to claim 1, wherein the spout portion includes:

a spouting tube portion having a tubular shape;

a flange portion extending outward from one end of the spouting tube portion; and a cap seal welded to the other end of the spouting tube portion, and closing an opening at the other end of the spouting tube portion, the spouting tube portion and the flange portion are formed of a first laminate including a first sealant layer, and a first gas barrier layer having gas barrier property, the cap seal is formed of a second laminate including a second sealant layer that can be welded to the first sealant layer, and a second gas barrier layer having gas barrier property, and the other end of the trunk portion is welded to the first sealant layer, on the peripheral portion of the flange portion.

15. The tubular container according to claim 14, wherein the spouting tube portion has, on an outer peripheral surface thereof, a thread that allows the cap to be attached thereto in a thread-engagement manner.

16. The tubular container according to claim 14, wherein an area, having a predetermined width including a cross section, of the first laminate is folded back.

17. The tubular container according to claim 14, wherein the first laminate has a cross section covered with the first sealant layer.

18. The tubular container according to claim 1, wherein the film member is a lamination film, the trunk portion is formed by adhering end parts of the film member, and the trunk portion includes a joint portion extending along a longitudinal direction thereof, the joint portion being formed by making parts of an innermost layer at the end parts of the film member face each other, and adhering the facing parts.

19. The tubular container according to claim 18, wherein the film member includes, as an outermost layer, a layer containing polyethylene terephthalate.

20. The tubular container according to claim 18, wherein the joint portion is provided with tabs extending from the end parts of the film member.

21. The tubular container according to claim 18, wherein the joint portion has notches formed in the end parts of the film member.

22. The tubular container according to claim 18, wherein the trunk portion is formed by making innermost layers at end parts of two or more film members face each other, and adhering the innermost layers to each other, and the trunk portion has a plurality of joint portions.

23. (The tubular container according to claim 1, wherein the other end of the trunk portion includes pleated parts not less than 3 and not more than 60, each pleated part being formed by folding back the trunk portion such that opposed parts of an inner peripheral surface of the trunk portion abut on each other.

24. The tubular container according to claim 23, wherein the peripheral portion of the spout portion has a circular shape as viewed from a longitudinal direction of the trunk portion, and the pleated parts are arranged at equal intervals along a circumferential direction of the peripheral portion.

25. The tubular container according to claim 1, wherein the trunk portion has a thinnest part having a thickness not smaller than 40 μm and not more than 200 μm, and a thickest part having a thickness not greater than twice the thickness of the thinnest part.

26. The tubular container according to claim 25, wherein the trunk portion includes a joint portion at which edges of the film member are joined to each other, and the joint portion is formed by making an inner layer and an outer layer of the film member face each other, and joining these layers, and the joint portion extends along the longitudinal direction of the trunk portion.

27. The tubular container according to claim 25, wherein the edges of the film member of the trunk portion are covered with a tape member, and the tape member is provided so as to extend in the longitudinal direction of the trunk portion.

28. The tubular container according to claim 1, wherein the spout portion has a valve.

29. The tubular container according to claim 28, wherein the valve allows the contents to be discharged from the trunk portion, and regulates inflow of air into the trunk portion while the contents are not discharged.

30. The tubular container according to claim 1, wherein the trunk portion includes, at the one end, a bottom portion that is closed by adhering an area over a width direction of the trunk portion, and the trunk portion includes ruled lines extending in a length direction of the trunk portion, between the other end of the trunk portion and an end portion of the bottom portion in the width direction.

31. A method for producing the tubular container according to claim 30, comprising:

forming the ruled lines in the trunk portion by heating and pressing the trunk portion at a temperature not higher than a fusing point of the film member forming the trunk portion.

* * * * *